(12) United States Patent
Nakazawa et al.

(10) Patent No.: US 11,890,694 B2
(45) Date of Patent: Feb. 6, 2024

(54) RESISTANCE SPOT WELDING APPARATUS AND METHOD FOR MANUFACTURING A WELDED STRUCTURE

(71) Applicant: NIPPON STEEL & SUMITOMO METAL CORPORATION, Tokyo (JP)

(72) Inventors: Yoshiaki Nakazawa, Tokyo (JP); Tohru Okada, Tokyo (JP); Yasuhiro Ito, Tokyo (JP); Masanori Yasuyama, Tokyo (JP); Yasunori Sawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 309 days.

(21) Appl. No.: 16/901,765

(22) Filed: Jun. 15, 2020

(65) Prior Publication Data

US 2020/0306866 A1    Oct. 1, 2020

Related U.S. Application Data

(62) Division of application No. 15/120,543, filed as application No. PCT/JP2015/057656 on Mar. 16, 2015, now abandoned.

(30) Foreign Application Priority Data

Mar. 14, 2014    (JP) ................................ 2014-051085
Aug. 29, 2014    (JP) ................................ 2014-175572

(51) Int. Cl.
*B23K 11/16*    (2006.01)
*B23K 11/11*    (2006.01)
(Continued)

(52) U.S. Cl.
CPC ............. *B23K 11/16* (2013.01); *B23K 11/115* (2013.01); *B23K 11/3009* (2013.01);
(Continued)

(58) Field of Classification Search
CPC .................. B23K 11/16; B23K 11/115; B23K 11/3009; B23K 11/31; B23K 35/02;
(Continued)

(56) References Cited

U.S. PATENT DOCUMENTS 2,244,455 A    6/1941    Gengenbach
3,028,480 A    4/1962    Charschan
(Continued)

FOREIGN PATENT DOCUMENTS

CN    101850468 A    10/2010
CN    103153519 A    6/2013
(Continued)

OTHER PUBLICATIONS

Author Unknown, "Welding and Joining," Society for Welding, Japan, April 5. 1995, p. 390, with partial English translation.
(Continued)

*Primary Examiner* — Brian W Jennison
(74) *Attorney, Agent, or Firm* — Birch, Stewart, Kolasch & Birch, LLP

(57) ABSTRACT

There is provided a resistance spot welding apparatus including a first rod-shaped electrode body, second rod-shaped electrode body, first ring-shaped member, second ring-shaped member, first elastic body, and second elastic body. The first rod-shaped electrode body and second rod-shaped electrode body are arranged facing each other, the first rod-shaped electrode body is inserted into a through hole of the first ring-shaped member, the first elastic body is connected to an opposite side of first ring-shaped member to second rod-shaped electrode body side, the first rod-shaped electrode body and first ring-shaped member are not electrically connected to each other, the second rod-shaped electrode body is inserted into a through hole of the second ring-shaped member, the second elastic body is connected to
(Continued)

an opposite side of second ring-shaped member to first rod-shaped electrode body side, and the second rod-shaped electrode body and second ring-shaped member are not electrically connected each other.

3 Claims, 18 Drawing Sheets

(51) Int. Cl.
    *B23K 11/30*     (2006.01)
    *B23K 11/31*     (2006.01)
    *B23K 35/02*     (2006.01)
    *B23K 101/00*     (2006.01)
    *B23K 101/18*     (2006.01)
    *B23K 103/04*     (2006.01)
    *B23K 101/28*     (2006.01)
    *C22C 38/38*     (2006.01)
    *C22C 38/02*     (2006.01)
    *C22C 38/00*     (2006.01)
    *C22C 38/18*     (2006.01)
    *C22C 38/06*     (2006.01)
    *C22C 38/04*     (2006.01)
    *F16B 5/08*     (2006.01)

(52) U.S. Cl.
CPC .............. *B23K 11/31* (2013.01); *B23K 35/02* (2013.01); *B23K 35/0205* (2013.01); *C22C 38/00* (2013.01); *C22C 38/02* (2013.01); *C22C 38/04* (2013.01); *C22C 38/06* (2013.01); *C22C 38/18* (2013.01); *C22C 38/38* (2013.01); *F16B 5/08* (2013.01); *B23K 2101/006* (2018.08); *B23K 2101/18* (2018.08); *B23K 2101/185* (2018.08); *B23K 2101/28* (2018.08); *B23K 2103/04* (2018.08)

(58) Field of Classification Search
CPC .......... B23K 35/0205; B23K 2101/006; B23K 2101/18; B23K 2101/185; B23K 2101/28; B23K 2103/04; B23K 11/10; B23K 11/30; C22C 38/38; F16B 5/08
See application file for complete search history.

(56) References Cited

U.S. PATENT DOCUMENTS

| | | | | |
|---|---|---|---|---|
| 3,778,583 | A * | 12/1973 | Becker ................ | B23K 11/163 219/91.21 |
| 3,992,602 | A * | 11/1976 | Ashton .............. | B23K 11/3063 219/98 |
| 4,135,075 | A * | 1/1979 | Heflin .................... | B23K 11/34 219/118 |
| 4,208,917 | A | 6/1980 | Aoyama et al. | |
| 4,831,228 | A * | 5/1989 | Schumacher .......... | B23K 11/31 219/86.22 |
| 6,709,535 | B2 | 3/2004 | Utsumi et al. | |
| 2003/0221752 | A1 | 12/2003 | Utsumi et al. | |
| 2010/0243616 | A1 | 9/2010 | Goto | |
| 2013/0020288 | A1 | 1/2013 | Moision et al. | |
| 2013/0180961 | A1* | 7/2013 | Goto ...................... | B23K 11/36 219/86.33 |

FOREIGN PATENT DOCUMENTS

| | | | |
|---|---|---|---|
| DE | 24 19 271 | A1 | 11/1975 |
| DE | 10 2011 018 653-41 | | 1/2012 |
| FR | 2 908 335 | A1 | 5/2008 |
| JP | 61-165282 | A | 7/1986 |
| JP | 63-68279 | A | 3/1988 |
| JP | 6368279 | A * | 3/1988 |
| JP | 63-183781 | A | 7/1988 |
| JP | 63183781 | A * | 7/1988 |
| JP | 6-55279 | A | 3/1994 |
| JP | 7-176563 | A | 7/1995 |
| JP | 8-168886 | A | 7/1996 |
| JP | 3117053 | B2 | 12/2000 |
| JP | 2001-9573-4 | | 1/2001 |
| JP | 2006-269452 | A | 10/2006 |
| JP | 2011-011259-4 | | 1/2011 |
| JP | 2012-76099 | A | 4/2012 |
| JP | 2012-76125 | A | 4/2012 |
| JP | 2012-192455 | A | 10/2012 |
| JP | 2013-76762 | A | 5/2013 |
| JP | 2013-111633 | A | 6/2013 |
| JP | 5333560 | B2 | 11/2013 |
| JP | 5359571 | B2 | 12/2013 |
| JP | 2014-24119 | A | 2/2014 |
| RU | 2243071 | C2 | 12/2004 |

OTHER PUBLICATIONS

Canadian Ofice Action dated June 9. 2017, issued in corresponding Canadian Patent Application 2,939,017.
Canadian Office Action, dated May 26, 2018, for corresponding Canadian Application No. 2,939,017.
Chinese Office Action and Search Report for corresponding Chinese Application No. 201580012319.9, dated Nov. 16, 2017, with a partial English translation of the Office Action.
Chinese Office Action and Search Report, dated Sep. 13, 2018, for corresponding Chinese Application No. 201580012319.9, with a partial English translation of the Office Action.
European Office Action dated Dec. 20, 2019, for corresponding European Application No. 15760701.1.
Extended European Search Report, dated Aug. 2, 2017, for corresponding European Application No. 15760701.1.
Final Office Action dated Mar. 13, 2020 for copending U.S. Appl. No. 15/120,543.
Indian Office Action for corresponding Indian Application No. 201617025963, dated Jun. 26, 2019, with English translation.
Indonesian Office Action, dated Feb. 19, 2019, for corresponding Indonesian Application No. P00201605933, with an English translation.
International Search Report for PCT/JP2015/057656 dated Jun. 16, 2015.
Japanese Notice of Reasons for Refusal for corresponding Japanese Application No. 2017-16456, dated Jun. 19, 2019, with English translation.
Japanese Office Action issued in Japanese Application No. 2016-507862 dated Feb. 28, 2017, together with a partial English translation.
Japanese Office Action issued in Japanese Application No. 2016-507862 dated Jun. 6, 2017, together with English translation.
Japanese Office Action, dated Apr. 2, 2019, for corresponding Japanese Application No. 2016-507862, with an English machine translation.
Korean Office Action dated Apr. 24, 2018, issued in the corresponding Korean Application No. 10-2016-7024296, with a partial English translation.
Korean Office Action, dated Nov. 19, 2018, for corresponding Korean Application No. 10-2016-7024296, along with a Partial English translation.
Nakamura et al., Gendai Yosetsu Gijutsu Taikei, vol. 8, Sanpo Publications, Inc., Jan. 23, 1980, pp. 70-73, total 7 pages.
Non-Final Office Action dated Jul. 18, 2019 for copending U.S. Appl. No. 15/120,543.
Oikawa et al., "Resistance Spot Weldability of High Strength Steel (HSS) Sheets for Automobile" Nippon Steel Technical Report, No. 385, Nippon Steel Corp., Oct. 20, 2006, pp. 36-41, total 10 pages.
Oikawa et al., "Resistance Spot Weldability of High Strength Steel (HSS) Sheets for Automobile", Nippon Steel Technical Report, No. 95, Nippon Steel Corp., Jan. 2007, pp. 39-45, total 10 pages.
Restriction Requirement dated Mar. 7, 2019 for copending U.S. Appl. No. 15/120,543.

(56) References Cited

OTHER PUBLICATIONS

Russian Office Action and Search Report for corresponding Russian Application No. 2016135355, dated Dec. 15, 2017, with an English translation.
Shinya et al., Splash Elimination in Spot Welding, Journal of the Welding Society, 2006, vol. 75, No. 2006, pp. 29-32.
Translation of Notice of Reasons for Refusal for Japanese Patent Application No. 2016-507862 dated Oct. 15, 2019.
Written Opinion of the International Searching Authority for PCT/JP2015/057656 (PCT/ISA/237) dated Jun. 16, 2015.
Shinya et al., Splash Elimination in Spot Welding, Journal of the Welding Society, 2008, vol. 75, No. 2006, pp. 29-32, with a partial English translation.

* cited by examiner

RESISTANCE SPOT WELDING APPARATUS AND METHOD FOR MANUFACTURING A WELDED STRUCTURE

This application is a Divisional of copending application Ser. No. 15/120,543 filed on Aug. 22, 2016, which is the U.S. National Phase of PCT/JP2015/057656, filed Mar. 16, 2015, and which claims priority under 35 U.S.C. § 119(a) to Application No. 2014-051085 filed in Japan on Mar. 14, 2014 and Application No. 2014-175572 filed in Japan on Aug. 29, 2014, the entire contents of all of which are expressly incorporated by reference into the present application.

TECHNICAL FIELD

The present invention relates to a resistance spot welding apparatus and a method for manufacturing a welded structure using the resistance spot welding apparatus. The welded structure including multiple steel sheets that are joined by using resistance spot welding (hereinafter simply referred to as "spot welding") at multiple locations in lapped portions in which multiple steel sheets are overlapped. In particular, the present invention relates to a welded structure that includes an expected deformation region that is expected to be deformed by receiving a load, and also relates to a method for manufacturing the welded structure.

BACKGROUND ART

FIG. 1 is a perspective view illustrating a structure of an automobile showing framework members. A front side member 2, a rear side member 3, and a side sill 7 are arranged on a side of the automobile. Each of these members is disposed along a vehicle front-back direction (hereinafter simply referred to as "front-back direction"). The front side member 2 and the rear side member 3 are disposed in the front and back portions, respectively, and the side sill 7 is disposed in the intermediate portion in the front-back direction.

Floor cross members 4 and 4', which are disposed in the intermediate portion in the front-back direction, extend in a vehicle widthwise direction along the floor surface. A center pillar 6 extending in a vertical direction is disposed on a side in the intermediate portion in the front-back direction. A bumper reinforcement 5 extending in a vehicle widthwise direction is disposed at the front end of the automobile. The above mentioned members are framework members that form the framework of the automobile.

The framework members and crash-boxes 1a and 1b are welded structures including multiple steel sheets. The welded structure has lapped portions in which multiple steel sheets are overlapped, and these steel sheets are joined by spot welding at multiple locations. When a spot weld portion (hereinafter simply referred to as "weld portion") fractures (shear fractures) in the case of automobile collision, the framework member cannot generate a desired deformation, and thus cannot sufficiently absorb the collision energy. Thus, the welded structure that can suppress the shear fracture is desired.

Patent Literature 1 describes a method for allowing a base steel sheet to fracture by reducing the width of a heat-influenced portion generated by welding in the case of using a high-tensile steel sheet having a tensile strength of 440 MPa. Patent Literature 2 describes a method for widely softening the outer sides of a weld nugget, and for providing equiaxial martensite structure inside the nugget, to obtain a resistance spot weld joint of the high-tensile steel sheet that is excellent both in tensile shear resistance and in cross tension properties. Patent Literatures 3 and 4 describe that the nugget diameter d is made to satisfy $3 \times t_m^{1/2} \leq d \leq 6 \times t_m^{1/2}$ ($t_m$ is the sheet thickness (mm) of the thinnest sheet) by controlling weld current conditions in multiple steps. Patent Literature 3 insists that the method can restrain initial expulsion and expulsion at the faying surface, and Patent Literature 4 insists that the method can achieve a high joint strength.

CITATION LIST

Patent Literature

Patent Literature 1: JP 2001-9573A
Patent Literature 2: JP 2013-78782A
Patent Literature 3: JP 5359571B
Patent Literature 4: JP 5333560B

SUMMARY OF INVENTION

Technical Problem

However, the methods of Patent Literatures 1 to 4 presupposes that the nugget diameters cannot be made to be larger than a certain diameter, which imposes limitations on fracture suppression at weld portions. In particular, as the tensile strength of a steel sheet becomes larger, the electric resistance becomes larger accordingly, which generates expulsion due to heat generation during welding and makes the nugget diameter smaller. This has led to a problem that the weld strength cannot be stably obtained.

The present invention is conceived in view of the above-described problem, and is directed to provide a resistance spot welding apparatus and method for manufacturing a welded structure using the resistance spot welding apparatus, which are new and improved and can reduce the fracture of the weld portions.

Solution to Problem

According to an embodiment of the present invention, there is provided a resistance spot welding apparatus includes a first rod-shaped electrode body, a second rod-shaped electrode body, a first ring-shaped member, a second ring-shaped member, a first elastic body, and a second elastic body. The first rod-shaped electrode body and the second rod-shaped electrode body are arranged facing each other, the first rod-shaped electrode body is inserted into a through hole of the first ring-shaped member, the first elastic body is connected to an opposite side of the first ring-shaped member to the second rod-shaped electrode body side, the first rod-shaped electrode body and the first ring-shaped member are not electrically connected each other, the second rod-shaped electrode body is inserted into a through hole of the second ring-shaped member, the second elastic body is connected to an opposite side of the second ring-shaped member to the first rod-shaped electrode body side, and the second rod-shaped electrode body and the second ring-shaped member are not electrically connected each other.

According to an embodiment of the present invention, there is provided a method for manufacturing a welded structure using the resistance spot welding apparatus described above. The method includes overlapping two or three steel sheets, sandwiching the steel sheets between the first rod-shaped electrode body and the second rod-shaped electrode body, pressing the first rod-shaped electrode body, the second rod-shaped electrode body, the first ring-shaped member, and the second ring-shaped member against the steel sheets, and applying an electric current between the first rod-shaped electrode body and the second rod-shaped electrode body.

Advantageous Effects of Invention

The resistance spot welding apparatus and method for manufacturing a welded structure using the resistance spot welding apparatus according to the present invention can reduce the fracture of the weld portion, as compared to known welded structures, and thus the welded structure exhibits an excellent collision energy absorbing capability. In particular, applying this invention to welded structures made of high-tensile steel sheets can provide such effects appreciably, thereby eliminating the necessity of thickening the steel sheets. Consequently, this enables the steel sheets to be thinner so that the weight of the welded structures can be further reduced.

DESCRIPTION OF EMBODIMENTS

Figure 1:
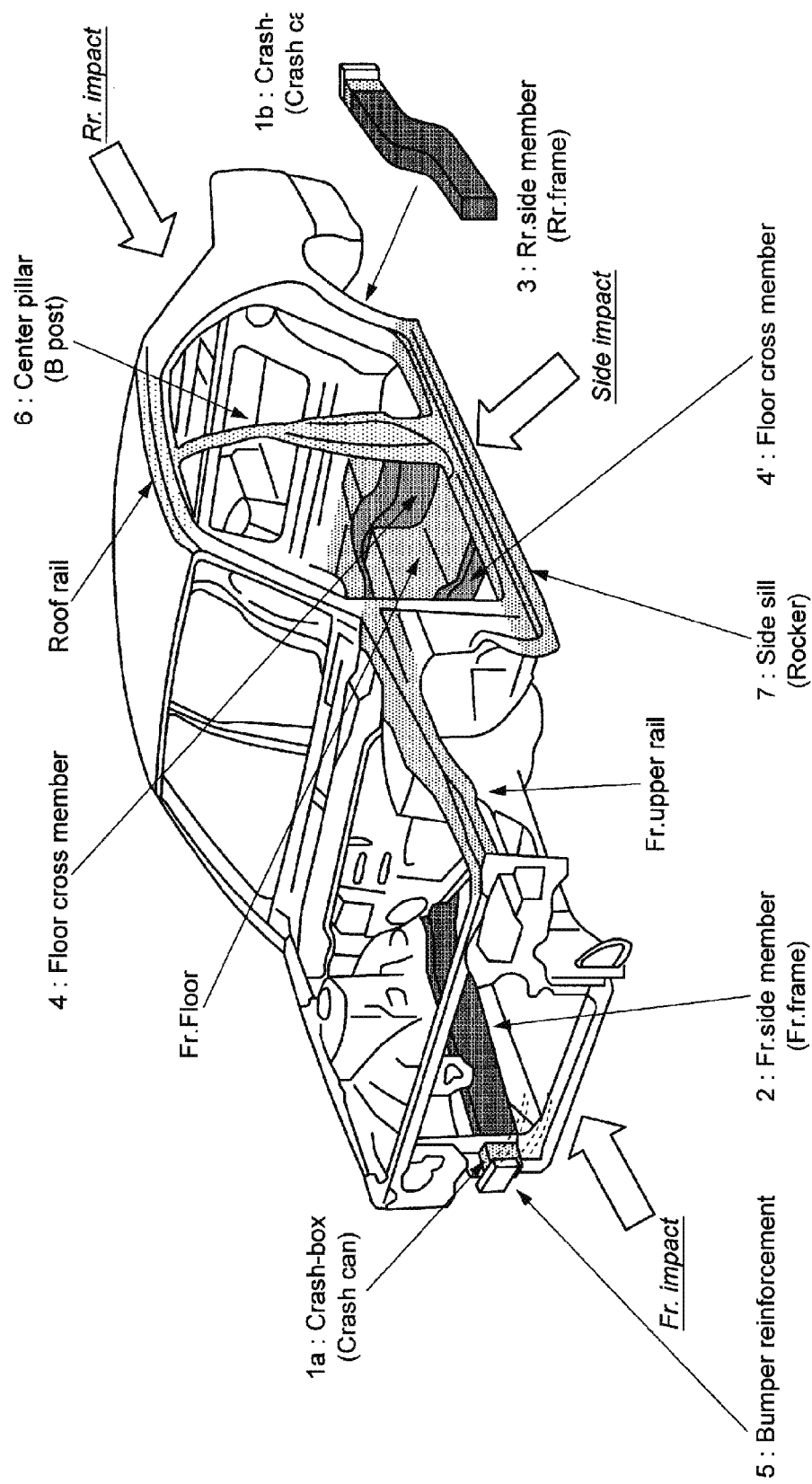
FIG. 1 is a perspective view illustrating an automobile structure showing framework members.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Now, the welded structure and the method for manufacturing the welded structure according to the present invention will be described in detail.

<Welded Structure>

As described above, there is provided a welded structure including two or three steel sheets and a lapped portion in which the steel sheets are overlapped and joined by spot welding at a plurality of locations, the welded structure including a spot weld portion, and, when a diameter of a nugget is $d_{ng}$ (mm), a tip diameter of an electrode used by the spot welding is d (mm), and an average thickness per steel sheet of the steel sheets at the lapped portion is $t_{ave}$ (mm), the spot weld portion satisfies a condition (a) or a condition (b) below in accordance with the average thickness $t_{ave}$ (mm).

$$(a) d_{ng} > d(t_{ave})^{1/2} \text{ when } 0.5 \text{ mm} \leq t_{ave} < 1.1 \text{ mm} \quad (1)$$

$$(b) d_{ng} > 1.05d \text{ when } 1.1 \text{ mm} \leq t_{ave} \leq 2.6 \text{ mm} \quad (2)$$

The welded structure according to the embodiment of the present invention may have a configuration in which two steel sheets are included and overlapped at the lapped portion (hereinafter referred to as "first embodiment"). When two steel sheets are a first and a second steel sheet, the first steel sheet can serve as a hat-channel member, and the second steel sheet can serve as a closing plate member, for example, as described later with reference to FIG. 8.

The welded structure according to the embodiment of the present invention may have a configuration including three steel sheets (hereinafter referred to as "second embodiment"). In this case, two sheets out of the three may be overlapped at the lapped portion, or all of the three sheets may be overlapped at the lapped portion. The welded structure of the second embodiment, for example, may be formed of a tube-shaped body and an intermediate plate that partitions the inner space of the body. More specifically, configuration examples illustrated in FIGS. 2A to 2D may be adopted when the three steel sheets serve as the first, the second, and the third steel sheet.

FIGS. 2A to 2D are right side views schematically illustrating configuration examples of the welded structure according to the second embodiment. FIGS. 2A, 2B, 2C and 2D illustrate a configuration example A, a configuration example B, a configuration example C, and a configuration example D, respectively. A welded structure 43 illustrated in FIG. 2A has the body formed of a first steel sheet 53 and a second steel sheet 63, and the intermediate plate formed of a third steel sheet 73. The first steel sheet 53 is the hat-channel member and the second steel sheet 63 is the closing plate member. The welded structure in the configuration example A has four lapped portions, and two out of the three steel sheets are overlapped at each lapped portion.

Figure 2A:
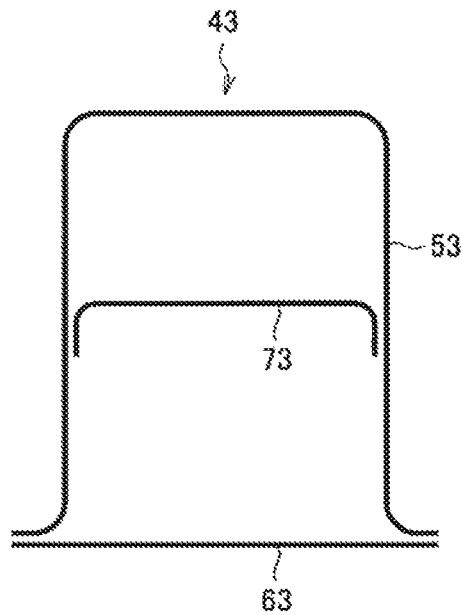
FIG. 2A is a right side view schematically illustrating a configuration example A of a welded structure according to the second embodiment.
Figure 2B:
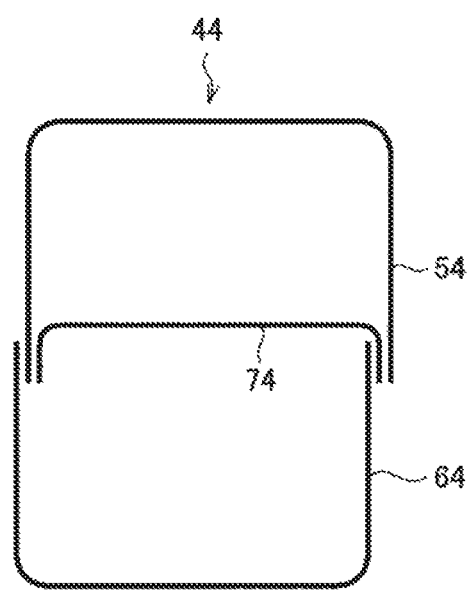
FIG. 2B is a right side view schematically illustrating a configuration example B of the welded structure according to the second embodiment.
Figure 2C:
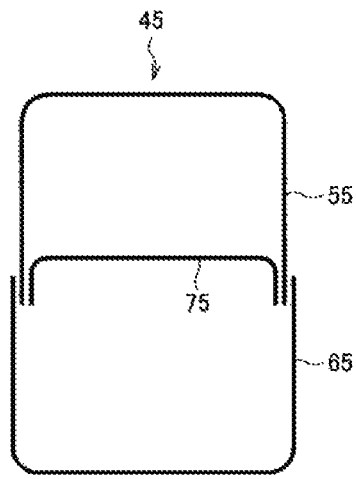
FIG. 2C is a right side view schematically illustrating a configuration example C of the welded structure according to the second embodiment.
Figure 2D:
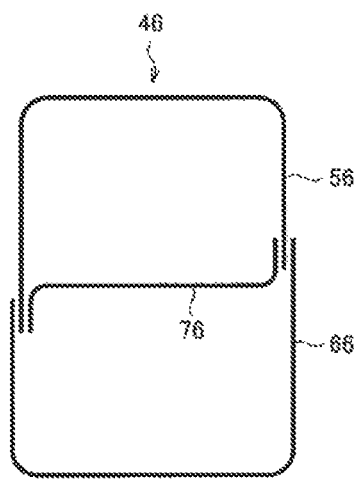
FIG. 2D is a right side view schematically illustrating a configuration example D of the welded structure according to the second embodiment.
Figure 3A:
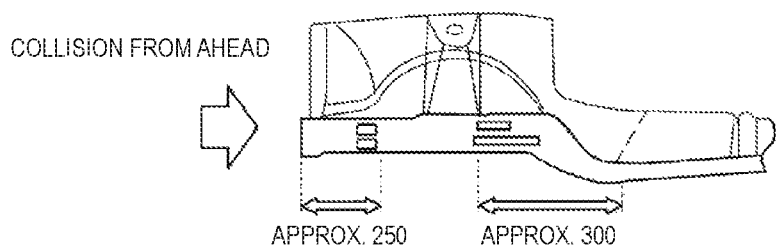
FIG. 3A is a side view illustrating a front side member, in which expected deformation regions are indicated.
Figure 3B:
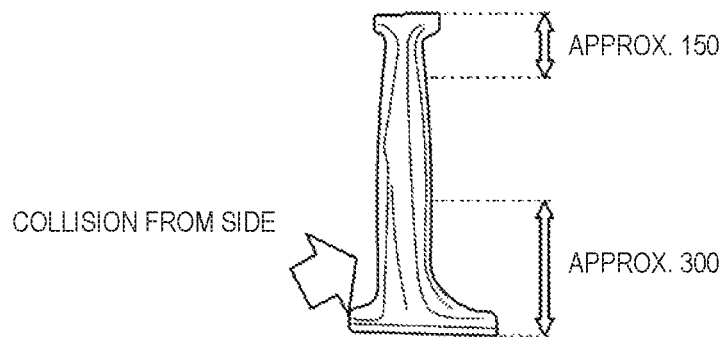
FIG. 3B is a side view illustrating a center pillar, in which expected deformation regions are indicated.
Figure 3C:
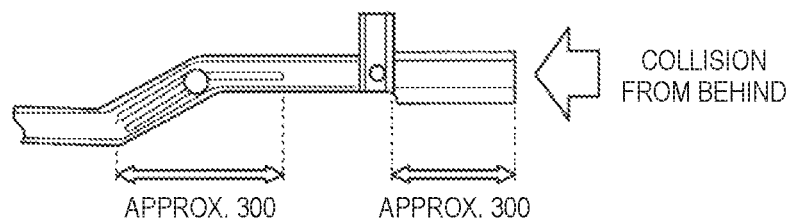
FIG. 3C is a side view illustrating a rear side member, in which expected deformation regions are indicated.
Figure 3D:
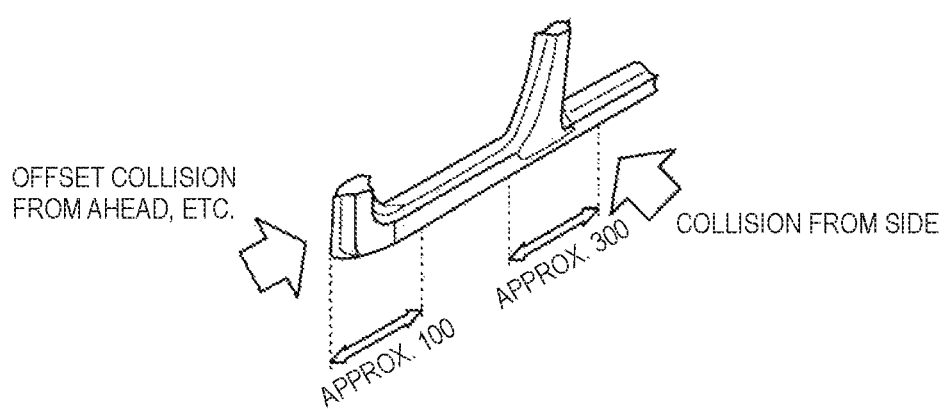
FIG. 3D is a perspective view illustrating a side sill, in which expected deformation regions are indicated.

Welded structures (44 to 46) illustrated in FIGS. 2B to 2D each have the body formed of a first steel sheet (54 to 56) and a second steel sheet (64 to 66). The intermediate plate is formed of a third steel sheet (74 to 76). The first steel sheet (54 to 56) and the second steel sheet (64 to 66) each have two bent portions with a predetermined angle (90° in these figures). The welded structure of the configuration examples B to D has two lapped portions, at each of which all of the three steel sheets are overlapped.

Figure 13A:
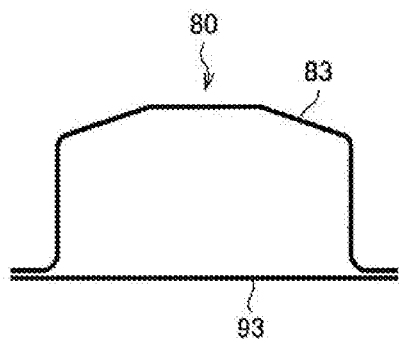
FIG. 13A is a right side view schematically illustrating a configuration example E of a welded structure according to a first embodiment.
Figure 13B:
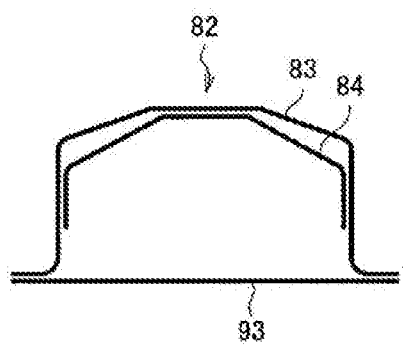
FIG. 13B is a right side view schematically illustrating a configuration example F of a welded structure according to the second embodiment.
Figure 14A:
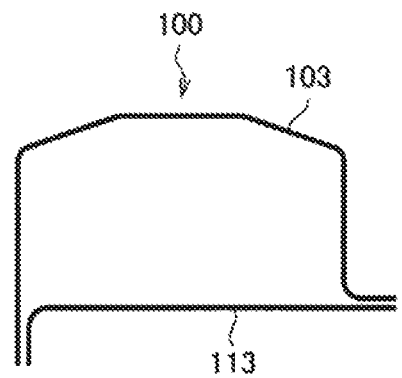
FIG. 14A is a right side view schematically illustrating a configuration example G of the welded structure according to the first embodiment.
Figure 14B:
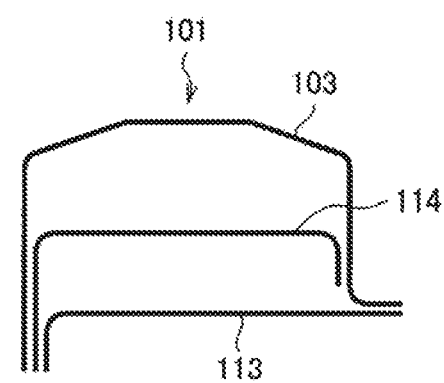
FIG. 14B is a right side view schematically illustrating a configuration example H of the welded structure according to the second embodiment.
Figure 15:
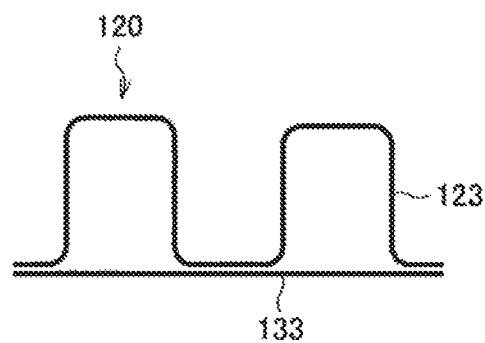
FIG. 15 is a right side view schematically illustrating a configuration example I of the welded structure according to the first embodiment.
Figure 16:
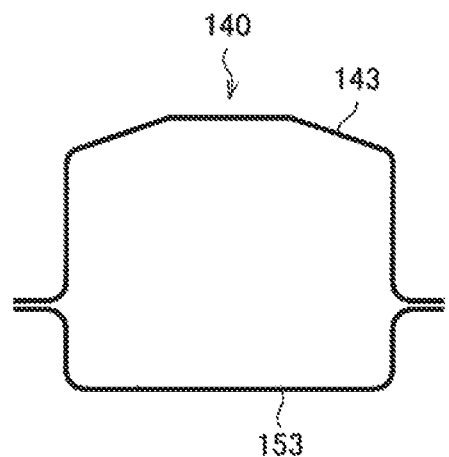
FIG. 16 is a right side view schematically illustrating a configuration example J of the welded structure according to the first embodiment.
Figure 17:
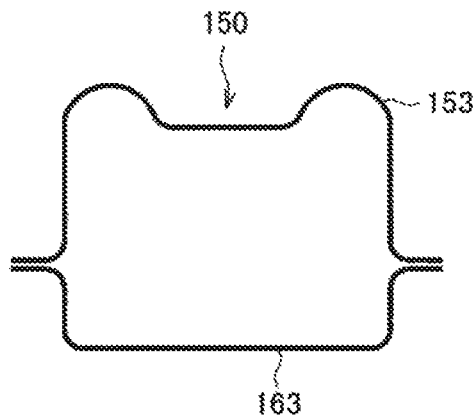
FIG. 17 is a right side view schematically illustrating a configuration example K of the welded structure according to the first embodiment.

FIGS. 13A and 13B illustrate a configuration example E and a configuration example F, FIGS. 14A and 14B illustrate a configuration example G and a configuration example H, and FIGS. 15, 16, and 17 illustrate a configuration example I, a configuration example J, and a configuration example K, respectively. A welded structure 80 illustrated in FIG. 13A has the body formed of a first steel sheet 83 and a second steel sheet 93. A welded structure 82 illustrated in FIG. 13B has the body formed of the first steel sheet 83 and the second steel sheet 93, and the intermediate plate is formed of a third steel sheet 84. The first steel sheet 83 is the hat-channel member, and the second steel sheet 93 is the closing plate member. The welded structure in the configuration example E has two lapped portions, and two steel sheets are overlapped at each lapped portion. The welded structure in the configuration example F has four lapped portions, and two out of the three steel sheets are overlapped at each lapped portion.

A welded structure 100 illustrated in FIG. 14A has the body formed of a first steel sheet 103 and a second steel sheet 113. A welded structure 101 illustrated in FIG. 14B has the body formed of the first steel sheet 103 and the second steel sheet 113, and the intermediate plate is formed of a third steel sheet 114. The first steel sheet 103 is the hat-channel member, and the second steel sheet 113 is the closing plate member. The welded structure in the configuration example G has two lapped portions, and two steel sheets are overlapped at each lapped portion. The welded structure in the configuration example H has four lapped portions, and two out of the three steel sheets are overlapped at three lapped portions. Three steel sheets are overlapped at the remaining one lapped portion.

A welded structure 120 illustrated in FIG. 15 has the body formed of a first steel sheet 123 and a second steel sheet 133. The first steel sheet 123 is the hat-channel member, and the second steel sheet 133 is the closing plate member. The welded structure in the configuration example I has three lapped portions, and two steel sheets are overlapped at each lapped portion.

A welded structure 140 illustrated in FIG. 16 has the body formed of a first steel sheet 143 and a second steel sheet 153. The first steel sheet 143 is the hat-channel member, and the second steel sheet 153 is the closing plate member. The welded structure in the configuration example J has two lapped portions, and two steel sheets are overlapped at each lapped portion.

A welded structure 150 illustrated in FIG. 17 has the body formed of a first steel sheet 153 and a second steel sheet 163. The first steel sheet 153 is the hat-channel member, and the second steel sheet 163 is the closing plate member. The welded structure in the configuration example K has two lapped portions, and two steel sheets are overlapped at each lapped portion.

With reference to FIG. 1, such welded structures of the present embodiment can be applied, for example, to any one of crash-boxes 1a and 1b, a front side member 2, a rear side member 3, floor cross members 4 and 4', a bumper reinforcement 5, a center pillar 6, and a side sill 7.

In most cases, collision against the automobile may occur from ahead, from behind, and from side (respectively represented by "Fr. impact", "Rr. impact", and "Side impact" with an accompanying thick arrow in FIG. 1). In such a case, a member near a collided portion in the automobile deforms. The above-described members each have a shape extending in the longitudinal direction. When a load is applied in the collision along the longitudinal direction (that is, the axial direction) to the vicinity of an end of the member, there occurs axial crush deformation (progressive plastic buckling deformation) in which the member contracts like bellows (or is folded in pleats) in the longitudinal direction. In addition, when the member has a bent portion and a load is applied in the collision in a direction along the longitudinal direction, there occurs bending deformation followed by buckling at the bent portion. When a load is applied in the collision to a central portion of the member in a direction perpendicular or oblique to the longitudinal direction of the member, there occurs bending deformation. When a load is applied to the member in a cross-sectional direction of the member, there occurs the collapse of the cross section accompanied by bending deformation, resulting in the overall bending deformation of the member.

Table 1 shows examples of the regions in which plastic deformation is expected by receiving a load (hereinafter referred to as "expected deformation region") for each of the members. FIG. 3A to FIG. 3D are diagrams each illustrating the expected deformation regions of the front side member 2, the center pillar 6, the rear side member 3, and the side sill 7.

TABLE 1

| Welded structure (member name) | Expected deformation region ratio (%) | Expected deformation region |
|---|---|---|
| Front side member | Approx. 30 o 60 | Axial crush deformation: region between the front end and approx. 250 mm from the front end Bending deformation: approx. 300 mm long region inthe mid portion in the longitudinal direction |
| Center pillar | Approx. 20 to 50 | Bending deformation: region between the top end andapprox. 150 mm from the top end Collapse of the cross section: region between thebottom end and approx. 300 mm from the bottom end |
| Rear side member | Approx. 35 to 60 | Axial crush deformation: region between the rear end and approx. 300 mm from the rear end Bending deformation: approx. 300 mm long region in the mid portion in the longitudinal direction |
| Side sill | Approx. 30 to 60 | Axial crush deformation: region between the front end and approx. 100 mm from the front end Bending deformation: approx. 300 mm long region in the mid portion in the longitudinal direction |

Note that "front end", "rear end", "top end", and "bottom end" are with respect to corresponding members that are mounted on an automobile.

In these members that are the welded structure, multiple weld portions created by spot welding are formed, for example, at equal intervals along the longitudinal direction of each member. The weld portions present in the expected deformation region satisfy either the above-mentioned condition (a) or (b).

In examples in Table 1 and FIGS. 3A to 3D, the length of the expected deformation regions with respect to the longitudinal direction of the welded structure is approximately 20 to 60% of the whole length of the welded structure. Thus, in the case that the spot weld portions are present approximately at equal intervals over the whole welded structure in the longitudinal direction thereof, approximately 20 to 60% spot weld portions of all the spot weld portions are present in the expected deformation region. In this case, the remaining spot weld portions do not have to satisfy either of the condition (a) or (b).

Regarding the crash-boxes 1a and 1b and the bumper reinforcement 5 (see FIG. 1), the expected deformation region covers the whole region of each member, and all of the weld portions of each member needs to satisfy either of the condition (a) or (b).

The diameter of the weld nugget defined in the conditions (a) and (b) is larger than the nugget diameter that can be formed by known spot welding without generating expulsion.

The expulsion is generated due to the fact that spot welding locally creates a region of high electric current density within an expected weld region of a base steel sheet, and sudden heating and melting of the region causes the melt of the base metal to spatter. Consequently, when the spatters are adhered to the welded structure, the shape of the nugget in terms of size and thickness distribution, and the like does not become uniform even if the conditions of the spot welding remains the same. As a result, the welded structure having the weld portions that satisfy the conditions (a) and (b) cannot be obtained in all of the expected deformation regions. Moreover, this does not stably provide the nuggets having a high strength, and thus causes shear fracture to occur frequently even if the conditions (a) and (b) are satisfied.

The welded structure of the present embodiment does not cause the generation of the expulsion and adhesion of the spatters, and the melt of the heated and melted base metal has not been observed to spatter out of the melted portions during manufacturing. Thus, uniform heating is achieved within the expected weld region, which causes the size and shape of the nuggets to be substantially uniform when the conditions of spot welding remain the same. In the welded structure of the present embodiment, satisfying either of the condition (a) or (b) makes the nugget strength stably high, and the shear fracture is not likely to occur.

In the present embodiment, when the tip diameter of an electrode used in the spot welding is unknown, the diameter of an indentation formed on the surface of the steel sheet of the welded structure can be regarded as the tip diameter of the electrode. The indentation is formed by the tip of the electrode being pressed on the surface of the steel sheet during spot welding. Now, the structure of the welded structure and a method for determining the diameter of the indentation will be described with reference to a case in which two steel sheets (the first and the second steel sheets) are joined.

Figure 4A:
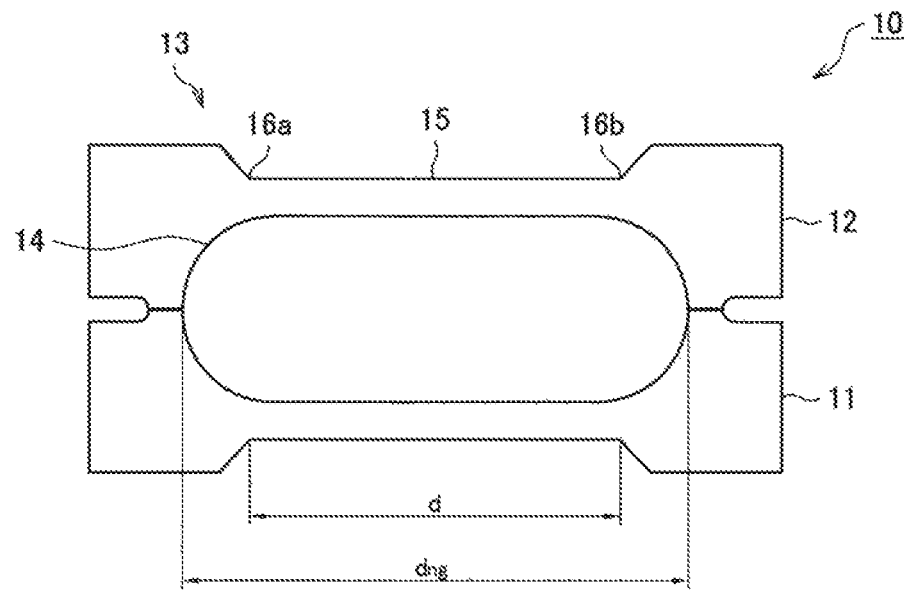
FIG. 4A is a cross-sectional view illustrating a vicinity of a spot weld portion in a welded structure when curvature changing regions are observed near both ends of an indentation.

FIG. 4A is a cross-sectional view illustrating the vicinity of a spot weld portion in the welded structure.

This welded structure 10 includes a first steel sheet 11 and a second steel sheet 12. The welded structure 10 has a lapped portion in which the first and the second steel sheets 11 and 12 are overlapped. The first steel sheet 11 and the second steel sheet 12 are joined at multiple locations in this lapped portion by spot welding. Only one spot weld portion 13 is shown in FIG. 4A.

An indentation 15, which corresponds to the tip of an electrode used for spot welding, is formed on the surface of each of the first and the second steel sheets 11 and 12. In FIG. 4A, a depressed portion is the indentation 15. A nugget 14 is formed inside the weld portion 13. In FIG. 4A, the weld portion 13 is substantially symmetrical with respect to the plane between the first steel sheet 11 and the second steel sheet 12, and thus reference numerals for, and related to, the indentation 15 are provided only for one of the first and the second steel sheets 11 and 12.

In the present embodiment, the diameter of a weld nugget (hereinafter referred to as "nugget diameter") $d_{ng}$ is defined as the maximum length of the nugget 14 in a direction parallel to the steel sheets (11 and 12) near the nugget 14. FIG. 4A is a cross section perpendicular to the first and the second steel sheets, illustrating the cross section of the indentation 15 including the maximum diameter portion (hereinafter referred to as "maximum diameter cross section"). The maximum length of the nugget 14 in a direction parallel to the first and the second steel sheets 11 and 12 in this cross section can be regarded as the nugget diameter. In a cut face of the weld portion 13, the nugget 14 displays a different color (brightness), and thereby the length of the nugget 14 in a direction parallel to the first and the second steel sheets 11 and 12 can be determined easily.

The indentation 15 corresponds to a region that is pressed by the tip of the electrode when spot welding is carried out. When the type and thickness of the steel sheets (the first steel sheet 11 and the second steel sheet 12 in the figure) that are pressed by the electrodes are the same, there is a tendency in which the indentation 15 becomes deeper as the nugget diameter $d_{ng}$ becomes larger.

The diameter d of the indentation 15 (that is, the tip diameter of the electrode used for spot welding) in the present embodiment is defined as below.

In FIG. 4A, regions where the curvature changes can be identified near both ends of the indentation 15. The inside surfaces of the indentation 15 include a bottom surface that is curved with a large curvature radius (or a flat surface), and inclined surfaces that are formed on the periphery of the bottom surface and are inclined as a whole with respect the bottom surface and that have a curvature radius smaller than that of the bottom surface. In the cross section in FIG. 4A, the curvature of the contour of the indentation 15 changes between the bottom surface and the inclined surfaces. In this case, the diameter d of the indentation 15 is a distance between two points 16a and 16b where the curvature changes (or the curvature change becomes maximum) in this cross section (maximum diameter cross section).

Figure 4B:
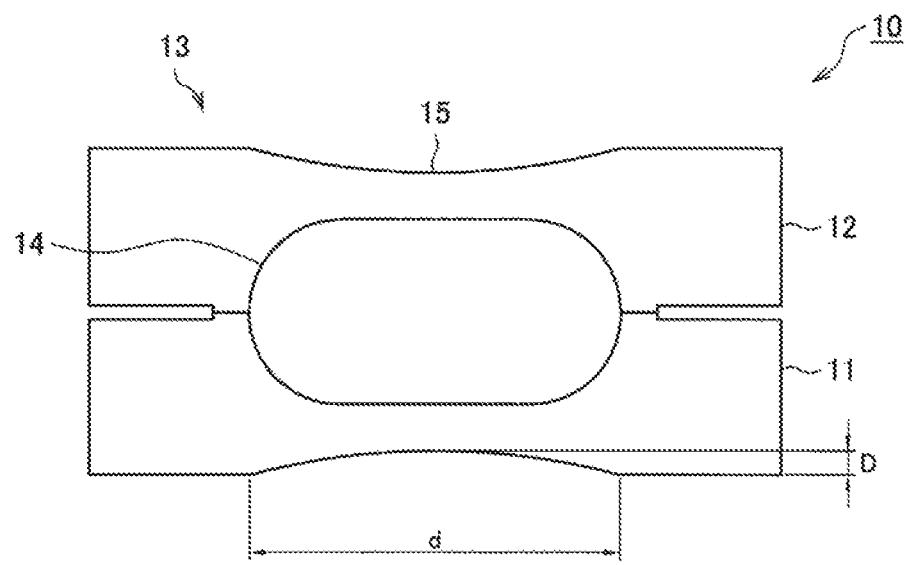
FIG. 4B is a cross-sectional view illustrating the vicinity of a spot weld portion in a welded structure when curvature changing regions are not observed near both ends of an indentation, but a depressed amount of the indentation can be identified.

FIG. 4B illustrates the vicinity of the weld portion 13, showing the maximum diameter cross section of a portion in which a region where the curvature changes in the indentation 15 is not observed but a depressed amount D of the indentation 15 is identifiable. In FIG. 4B, the same reference numerals are used for components similar to those in FIG. 4A, thereby omitting the description thereof.

In this case (including the case in which the region where the curvature changes are observable near only one end of the indentation 15), the length of the indentation 15 (depressed region) in the direction parallel to the steel sheets (11 and 12) in this cross section is regarded as the diameter d of the indentation 15.

Figure 4C:
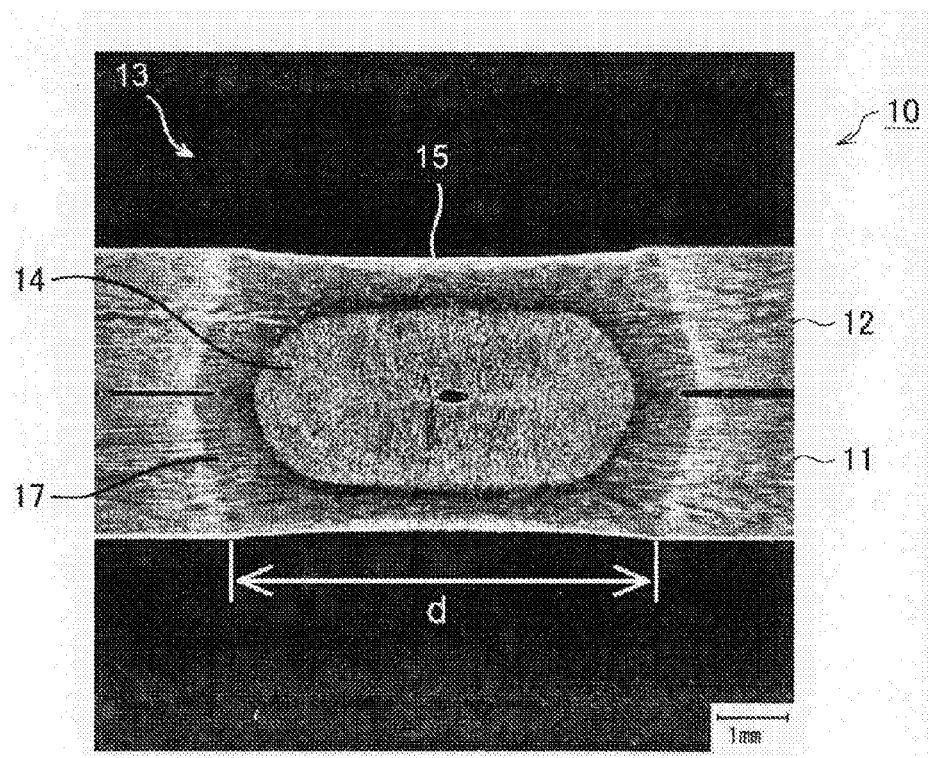
FIG. 4C is a photograph showing a cut surface of the vicinity of a spot weld portion of a welded structure when a depressed amount of an indentation cannot be identified.

FIG. 4C is a photograph showing a cut face of a portion near the weld portion 13 that is cut at the maximum diameter cross section. In this portion, the depressed amount of the indentation 15 is not identifiable. In FIG. 4C, the same reference numerals are used for components similar to those in FIG. 4A, thereby omitting the description thereof. A hardened portion 17 generated by heat influence is present around the nugget 14. The hardened portion 17 is formed by the first and the second steel sheet 11 and 12 as base metals being heated to the austenite region and then being quenched during spot welding.

When the depressed amount of the indentation 15 is not identifiable, the diameter of the hardened portion 17 generated by heat influence in the maximum diameter cross section of the first or the second steel sheet 11 or 12 is regarded as the diameter d of the indentation 15. In the cross section, the brightness of the hardened portion 17 generated by heat influence is different from that of another portion, and thus the diameter of the hardened portion 17 generated by heat influence can be determined easily.

While the tip diameter of the electrode used for spot welding is determined from the diameter of the indentation by the method described with reference to FIGS. 4A to 4C, the tip diameter may instead be determined from the maximum diameter of a region having a high Cu (copper) concentration on the surface of the steel sheet. The electrodes to be used for spot welding contain Cu, and Cu is transferred to the surface of the steel sheet during spot welding. Thus, the region having a high Cu concentration on the surface of the steel sheet corresponds to the tip of the electrode.

In either case of determining the diameter of the indentation by using the method described with reference to FIGS. 4A to 4C or by using the region having a high Cu concentration, when the diameter d of the indentation 15 of one steel sheet 11 cannot be regarded identical to the diameter d of the indentation 15 of the other steel sheet 12, an average of the diameters d of the indentations 15 of both steel sheets 11 and 12 is regarded as the diameter d of the indentation 15.

In the present embodiment, when the lapped portion in which two steel sheets are overlapped is joined by spot welding, the average thickness $t_{ave}$ (mm) per steel sheet at the lapped portion is $(t_1+t_2)/2$, where $t_1$ (mm) and $t_2$ (mm) represent the individual thicknesses of the two steel sheets, respectively. The average thickness $t_{ave}$ is 0.5 mm or more and 2.6 mm or less. When the average thickness $t_{ave}$ is in this range, it is possible to form the weld portion that satisfies the Formula (1) or (2) without generating expulsion by using a preferred method for manufacturing the welded structure of the present embodiment (see later description).

In the present embodiment, when the lapped portion in which three steel sheets are overlapped is joined by spot welding, the average thickness per steel sheet $t_{ave}$ (mm) at the lapped portion is $(t_3+t_4+t_5)/3$, where $t_3$ (mm), $t_4$ (mm), and $t_5$ (mm) represent the individual thicknesses of the three steel sheets, respectively. The average thickness $t_{ave}$ is 0.5 mm or more and 2.6 mm or less, which is the same as in the case that the lapped portion in which two steel sheets are overlapped is joined by spot welding. When the average thickness $t_{ave}$ is in this range, it is possible to form the weld portion that satisfies Formula (1) or (2) without generating expulsion by using the preferred method for manufacturing the welded structure of the present embodiment (see later description).

In the present embodiment, the amount of energy that can be absorbed when the welded structure receives impact becomes larger as the interval between weld portions is smaller, in other words, the number of weld portions in a given unit length of the welded structure is larger. However, if the interval between weld portions is made too small, adjacent nuggets may be overlapped with each other. This causes a shunt current to flow in a direction toward an adjacent nugget, thereby preventing the nugget from being formed to have a predetermined diameter. Thus, the interval between weld portions is preferably 17 mm or more.

The present embodiment is preferably applied to welded structures having weld portions in which Ceq, that is, an equivalent C (carbon) content, defined in Formula (3) below is 0.13 mass % or more.

$$Ceq=[C]+1/90[Si]+1/100([Mn]+[Cr]) \quad (3)$$

where
[C]: average C content (mass %) of weld portion;
[Si]: average Si content (mass %) of weld portion;
[Mn]: average Mn content (mass %) of weld portion; and
[Cr]: average Cr content (mass %) of weld portion.

In general, as the equivalent carbon content in steel sheets to be welded becomes larger, the electric resistance becomes higher and spot welding becomes more difficult to carry out without generating expulsion. When the equivalent carbon content (Ceq) of the weld portion is 0.13 mass % or more, it is extremely difficult to carry out spot welding without generating expulsion by using known manufacturing methods. On the other hand, it can be achieved by using the preferred method for manufacturing the welded structure of the present embodiment (see later description).

The equivalent carbon content (Ceq) of the weld portion is approximately equal to an equivalent carbon content based on an average chemical composition of multiple steel sheets. When two steel sheets (the first and the second steel sheets) are joined by spot welding at the lapped portion in which the two sheets are overlapped, and when the thicknesses of the two steel sheets are different, the average chemical composition of the two steel sheets is calculated as a weighted average between the average chemical composition of the first steel sheet and the average chemical composition of the second steel sheet with respect to the thicknesses $t_1$ and $t_2$. More specifically, the equivalent carbon content ($Ceq_{plate}$) of the first and the second steel sheets based on their average chemical compositions is given in Formula (6) below.

$$Ceq_{plate} = R_1[C]_1 + R_2[C]_2 + 1/90(R_1[Si]_1 + R_2[Si]_2) + 1/100(R_1[Mn]_1 + R_2[Mn]_2 + R_1[Cr]_1 + R_2[Cr]_2) \quad (6)$$

where

[C]$_1$: is average C content (mass %) of the first steel sheet;

[C]$_2$: average C content (mass %) of the second steel sheet;

[Si]$_1$: average Si content (mass %) of the first steel sheet;

[Si]$_2$: average Si content (mass %) of the second steel sheet;

[Mn]$_1$: average Mn content (mass %) of the first steel sheet;

[Mn]$_2$: average Mn content (mass %) of the second steel sheet;

[Cr]$_1$: average Cr content (mass %) of the first steel sheet;

[Cr]$_2$: average Cr content (mass %) of the second steel sheet;

$$R_1 = t_1/(t_1+t_2); \text{ and}$$

$$R_2 = t_2/(t_1+t_2).$$

When three steel sheets (the first, the second, and the third steel sheets) are joined by spot welding at the lapped portion in which the three sheets are overlapped, and when the thicknesses of the three steel sheets are different, the average chemical composition of the three steel sheets is calculated as a weighted average among the average chemical composition of the first steel sheet, the average chemical composition of the second steel sheet, and the average chemical composition of the third steel sheet with respect to the thicknesses $t_3$, $t_4$ and $t_5$. More specifically, the equivalent carbon content ($Ceq_{plate}$) for the first, the second, and the third steel sheets based on their average chemical compositions is given in Formula (7) below.

$$Ceq_{plate} = R_3[C]_3 + R_4[C]_4 + R_5[C]_5 + 1/90(R_3[Si]_3 + R_4[Si]_4 + R_5[Si]_5) + 1/100(R_3[Mn]_3 + R_4[Mn]_4 + R_5[Mn]_5 + R_3[Cr]_3 + R_4[Cr]_4 + R_5[Cr]_5) \quad (7)$$

where

[C]$_3$: average C content (mass %) the first steel sheet;

[C]$_4$: average C content (mass %) of the second steel sheet;

[C]$_5$: average C content (mass %) of the third steel sheet;

[Si]$_3$: average Si content (mass %) of the first steel sheet;

[Si]$_4$: average Si content (mass %) of the second steel sheet;

[Si]$_5$: average Si content (mass %) of the third steel sheet;

[Mn]$_3$: average Mn content (mass %) of the first steel sheet;

[Mn]$_4$: average Mn content (mass %) of the second steel sheet;

[Mn]$_5$: average Mn content (mass %) of the third steel sheet;

[Cr]$_3$: average Cr content (mass %) of the first steel sheet;

[Cr]$_4$: average Cr content (mass %) of the second steel sheet;

[Cr]$_5$: average Cr content (mass %) of the third steel sheet;

$$R_3 = t_3/(t_3+t_4+t_5);$$

$$R_4 = t_4/(t_3+t_4+t_5); \text{ and}$$

$$R_5 = t_5/(t_3+t_4+t_5).$$

Now, a chemical composition of a high-tensile steel sheet, which is a difficult material for welding and which can be used for the present embodiment, will be described below by way of example. It is assumed that a chemical composition example below is used to form a streel structure that mainly contains bainite and martensite as main phases, and also contains ferrite and residual austenite partially. The steel sheet containing such a structure exhibits a high strength and also a ductility to a level in which the base metal does not fracture in a collision event. The steel sheet according to the present embodiment is not limited to the above-described structure or the steel sheet containing the chemical composition described below. In terms of the content of each element, "%" means "mass %" in the example below.

<Example of Chemical Composition of Steel Sheet>

(i) C: 0.06% to 0.35%

C has an effect of promoting the generation of bainite or martensite as a main phase and also the generation of residual austenite. C also has an effect of enhancing the tensile strength of a steel sheet by improving the strength of the martensite. In addition, C strengthens steel by way of solid solution hardening and provides an effect of improving the yield strength and tensile strength of the steel sheet.

A C content of less than 0.06% may make it difficult to obtain the above-described effects. Thus, the C content is set preferably at 0.06% or more, more preferably at more than 0.12%, and still more preferably at more than 0.14%. In contrast, if the C content exceeds 0.35%, the hardness of the martensite may become excessively high, or the stability of the residual austenite may become excessively increased, to cause work-induced transformation to be less likely to occur. This may result in a substantial decrease in local ductility of the steel sheet. Moreover, weldability deteriorates considerably. Therefore, it is preferable to set the C content at an amount of 0.35% or less.

(ii) Mn: 1.0% to 3.5%

Mn has an effect of promoting the generation of bainite or martensite as a main phase, and also the generation of residual austenite. Mn also strengthens steel by way of solid solution hardening and provides an effect of improving the yield strength and tensile strength of a steel sheet. Moreover, Mn enhances bainite strength by way of solid solution hardening so as to provide an effect of improving local ductility of the steel sheet by improving the bainite hardness under high-strain loading conditions.

A Mn content of less than 1.0% may make it difficult to obtain the above-described effects. Thus, the Mn content is set preferably at 1.0% or more, more preferably at more than 1.5%, still more preferably at more than 1.8%, and especially preferably at more than 2.0%. In contrast, a Mn content of more than 3.5% excessively retards bainite transformation, which fails to stabilize the residual austenite so as to make it difficult to obtain a predetermined amount of residual austenite. Therefore, the Mn content is preferably set at 3.5% or less.

(iii) Si+Al: 0.20% to 3.0%

Si and Al have an effect of promoting the generation of residual austenite by reducing the generation of carbides in bainite to improve the uniform ductility and local ductility of the steel sheet. Si and Al also strengthen steel by way of solid solution hardening and provides an effect of improving the yield strength and tensile strength of a steel sheet. Moreover, Si and Al enhance bainite strength by way of solid solution hardening so as to provide an effect of improving local ductility of the steel sheet by improving the bainite hardness under high-strain loading conditions.

A total content of Si and Al (hereinafter referred to as "(Si+Al) content") of less than 0.20% makes it difficult to obtain such effects. Consequently, the (Si+Al) content is set preferably at 0.20% or more, more preferably at 0.5% or more, and still more preferably at 0.8% or more. In contrast, a (Si+Al) content of more than 3.0% will only result in saturating the above-described effects, which leads to cost disadvantage. This also results in rising the transformation temperature and thus in hampering productivity. Therefore, the (Si+Al) content is preferably set at 3.0% or less.

Si has an excellent solid solution hardening capability. Thus, the Si content is set preferably at 0.20% or more, and more preferably at 0.8% or more. In contrast, Si has an effect of deteriorating the chemical conversion treatability and the weldability of the steel sheet, and thus the Si content is set preferably at less than 1.9%, more preferably at less than 1.7%, and still more preferably at less than 1.5%.

(iv) P: 0.10% or Less

In general, P is contained as an impurity. P is segregated in grain boundaries to make steel brittle, thereby aggravating crack generation when an impact load is applied. A P content of more than 0.10% noticeably embrittles steel due to the above-described effect, making it difficult to suppress the crack generation when an impact load is applied. The P content is preferably less than 0.020%, and more preferably less than 0.015%.

(v) S: 0.010% or Less

In general, S is contained as an impurity, and S has an effect of deteriorating formability by forming sulfide-base inclusions. The above-described effects becomes evident at a S content of more than 0.010%. The S content is preferably 0.005% or less, more preferably less than 0.003%, and especially preferably 0.001% or less.

(vi) N: 0.010% or Less

In general, N is contained in steel as an impurity, and N has an effect of deteriorating the ductility of the steel sheet. The deterioration of the ductility becomes evident at an N content of more than 0.010%. The N content is preferably 0.0050% or less.

As described above, the steel contains C: 0.06% to 0.35%, Mn: 1.0% to 3.5%, (Si+Al): 0.20% to 3.0%, P: 0.10% or less, S: 0.010% or less, N: 0.010% or less, and the balance: Fe and impurities. Here, the impurities means what comes to be mixed in from law materials such as ore and scrap, from manufacturing environment, and so on, in the industrial steel manufacturing. The impurities are allowed as far as they do not negatively influence the steel of concern to the present embodiment.

Elements that will be described hereafter are optional, and can be contained, when necessary as a substitute of a portion of Fe, in the steel having the above-described chemical composition.

(vii) One or More Elements Selected From the Group Consisting of Cr: 0.5% or Less, Mo: 0.5% or Less, and B: 0.01% or Less.

Cr, Mo, and B have an effect of improving hardenability and promoting bainite generation. In addition, these elements have an effect of promoting the generation of martensite and residual austenite, and also have an effect of strengthening the steel by solid solution hardening to improve the yield strength and tensile strength of the steel sheet. Therefore, one or more elements selected from the group consisting of Cr, Mo, and B may be contained. To make sure of obtaining the above-described effect, it is preferable to satisfy any one of Cr: 0.1% or more, Mo: 0.1% or more, and B: 0.0010% or more.

However, if the Cr content exceeds 0.5%, the Mo content exceeds 0.5%, or the B content exceeds 0.01%, noticeable deterioration in the uniform elongation and local ductility of the steel sheet may be resulted. Thus, when one species or more of Cr, Mo, and B are contained, it is preferable to have each content within the above-described content range.

<Method for Manufacturing Welded Structure>

1. Resistance Spot Welding Apparatus

Figure 5A:
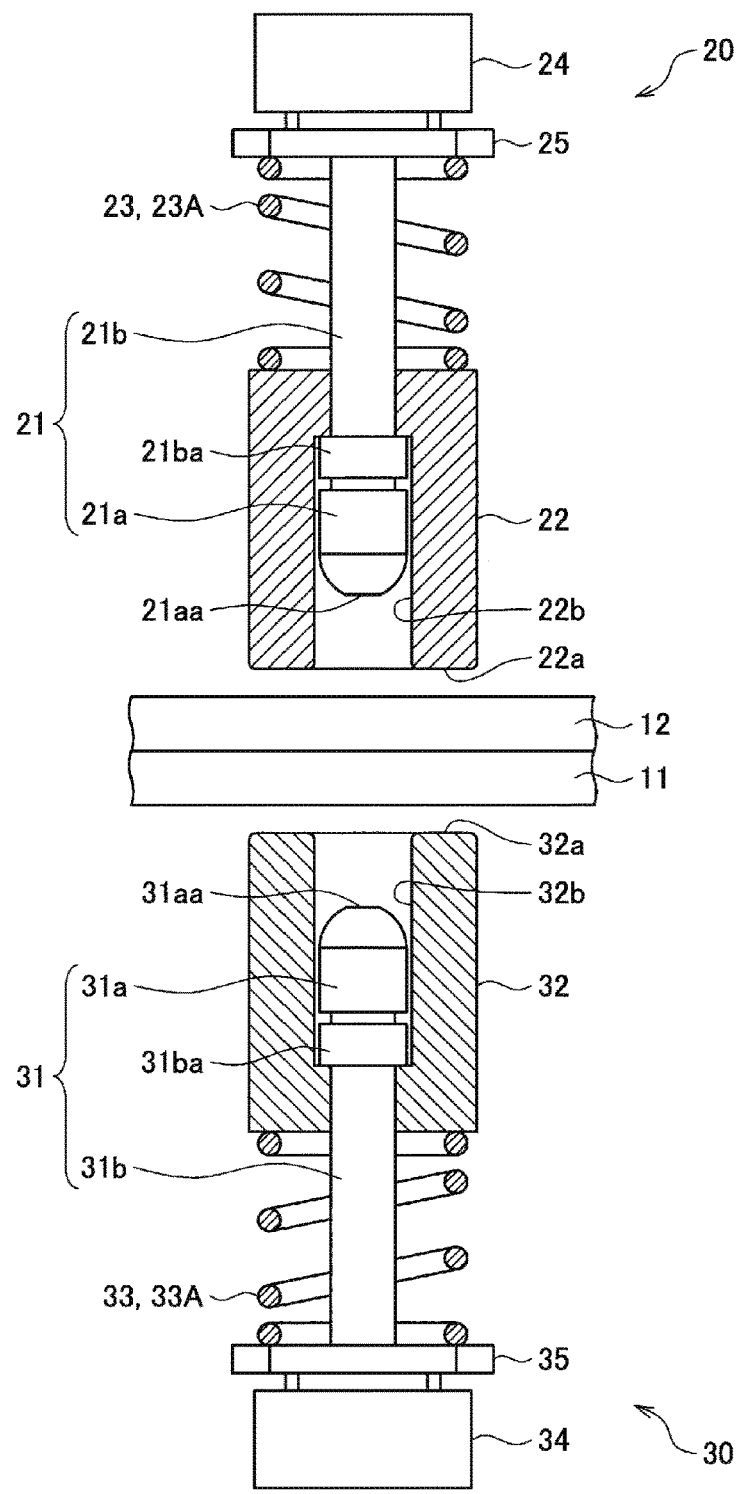
FIG. 5A is a schematic diagram illustrating an example of a resistance spot welding apparatus that can be used in the method for manufacturing welded structures according to the present invention, showing a state of the apparatus before welding starts.
Figure 5B:
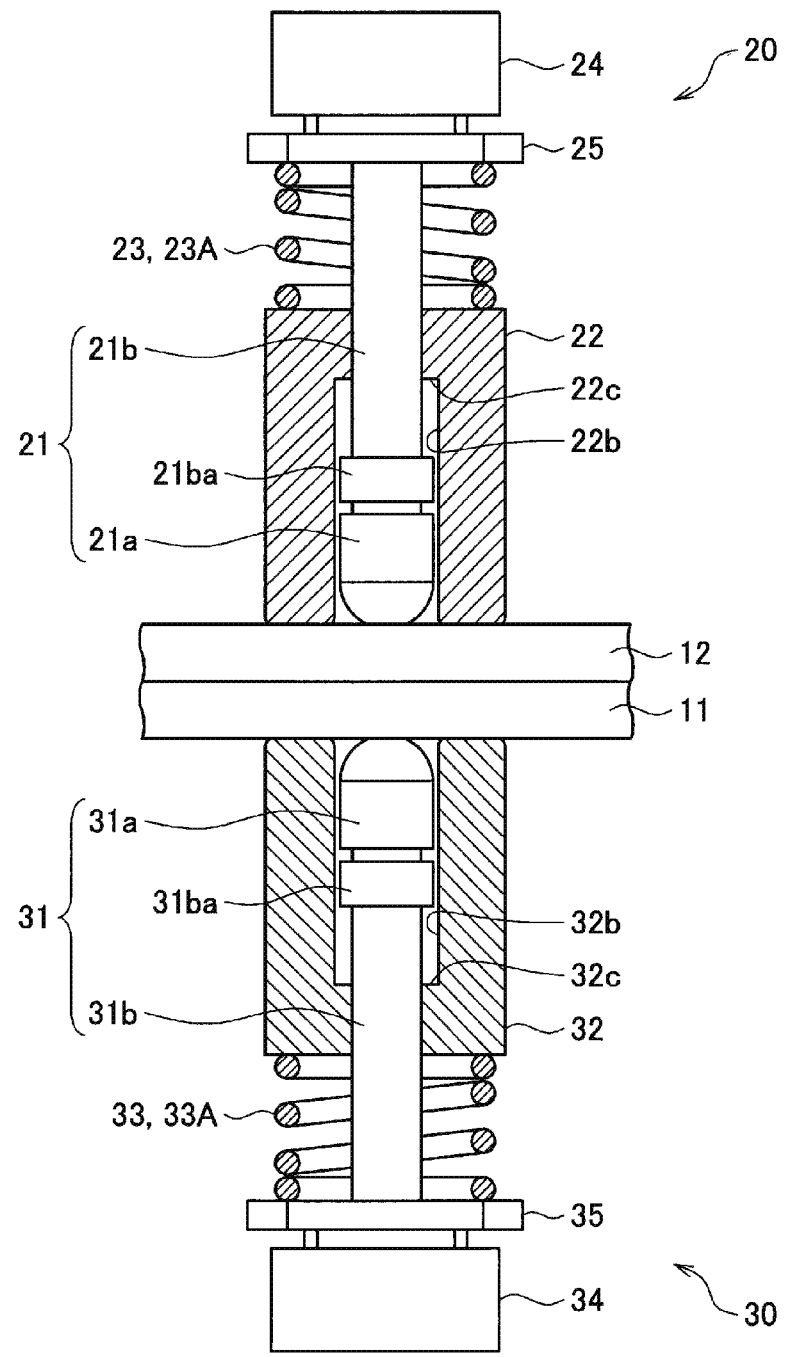
FIG. 5B is a schematic diagram illustrating an example of a resistance spot welding apparatus that can be used in the method for manufacturing welded structures according to the present invention, showing a state of the apparatus during welding.

FIGS. 5A and 5B are schematic diagrams illustrating an example of a resistance spot welding apparatus that can be used for the method for manufacturing welded structures according to the present invention. FIG. 5A illustrates a state before welding, and FIG. 5B illustrates a state during welding. The spot welding apparatus illustrated in FIGS. 5A and 5B includes a pair of combined electrodes 20 and 30. For convenience of description, one of the combined electrodes 20 and 30 is hereinafter also referred to as a first combined electrode 20 (the upper combined electrode in FIGS. 5a and 5B), and the other as a second combined electrode 30 (the lower combined electrode in FIGS. 5a and 5B). The first combined electrode 20 and the second combined electrode 30 are arranged in a face to face manner, sandwiching the lapped portion in which multiple steel sheets to be spot welded are overlapped (the first and the second steel sheets 11 and 12 in the figures). The first combined electrode 20 and the second combined electrode 30 have the same configuration. In other words, the first combined electrode 20 has a first electrode body 21 and a first ring-shaped member 22 whereas the second combined electrode 30 has a second electrode body 31 and a second ring-shaped member 32.

The first electrode body 21 has a rod-shaped straight shank 21b and an electrode tip 21a mounted at the end of the shank 21b. The first electrode body 21 as a whole is shaped like a rod. The shank 21b has a collar portion 21ba adjacent to the electrode tip 21a that is a DR-type electrode tip. In other words, the electrode tip 21a has a substantially cylindrical shape with its tip convexly protruding, and has a tip face 21aa formed as a convex surface with a large curvature radius. The curvature radius becomes smaller in the peripheral portion of the tip face 21aa. In other words, the curvature changes between the tip face 21aa and the peripheral portion thereof.

Instead of the DR-type electrode tip, a known electrode tip, for example, a flat-type electrode tip, may be used as the electrode tip 21a. The back end portion of the shank 21b is fixed to a holder 24.

The first ring-shaped member 22 is cylindrically shaped and has a round through hole 22b on the central axis of the first ring-shaped member 22. The first electrode body 21 is disposed on the central axis. The electrode tip 21a and the collar portion 21ba of the first electrode body 21 are inserted in the first ring-shaped member 22 and are movable along the axial direction relatively toward a plane including the tip face 22a of the first ring-shaped member 22. The backward movement of the electrode tip 21a in the first ring-shaped member 22 is restricted by the collar portion 21ba of the first electrode body 21, which comes into contact with a stopper face 22c in the back end portion of the first ring-shaped member 22. The first ring-shaped member 22 and the first electrode body 21 are not connected electrically.

A retainer plate 25 is fixed to the front end of the holder 24. A compression coil spring 23A is disposed as a first elastic body 23 between the back end of the first ring-shaped member 22 and the retainer plate 25. The shank 21b of the first electrode body 21 is disposed on the central axis of the compression coil spring 23A (first elastic body 23). The first ring-shaped member 22 is movable relatively along the shank 21b.

Similarly, the second electrode body 31 has a rod-shaped straight shank 31b and an electrode tip 31a mounted at the end of the shank 31b. The second electrode body 31 as a whole is shaped like a rod. The shank 31b has a collar portion 31ba adjacent to the electrode tip 31a that is a DR-type electrode tip. The back end portion of the shank 31b is fixed to a holder 34.

The second ring-shaped member 32 is cylindrically shaped and has a round through hole 32b on the central axis of the second ring-shaped member 32. The second electrode body 31 is disposed on the central axis. The electrode tip 31a and the collar portion 31ba of the second electrode body 31 are incorporated in the second ring-shaped member 32 and are movable along the axial direction relatively toward a plane including the tip face 32a of the second ring-shaped member 32. The backward movement of the electrode tip 31a in the second ring-shaped member 32 is restricted by the collar portion 31ba of the second electrode body 31, which comes into contact with a stopper face 32c in the back end portion of the second ring-shaped member 32. The second ring-shaped member 32 and the second electrode body 31 are not connected electrically.

A retainer plate 35 is fixed to the front end of the holder 34. A compression coil spring 33A is disposed as a second elastic body 33 between the back end of the second ring-shaped member 32 and the retainer plate 35. The shank 31b of the second electrode body 31 is disposed on the central axis of the compression coil spring 33A (second elastic body 33). The second ring-shaped member 32 is movable relatively along the shank 31b.

The materials of the shanks 21b and 31b and the electrode tips 21a and 31a, which respectively form the first electrode body 21 and the second electrode body 31, are copper-chromium alloy, copper-chromium-zirconium alloy, copper-beryllium alloy, alumina dispersion-strengthened copper, copper-tungsten alloy, and so on. In any case, the electrode tips 21a and 31a contain copper.

It is desirable that the first ring-shaped member 22 and the second ring-shaped member 32 are substantially not deformable against external force. The material of each member is not limited specifically, and thus it may be an electric conductor such as a metal, etc., or may be an insulator such as ceramics, etc. In addition, the materials of the first ring-shaped member 22 and the second ring-shaped member 32 may be the same as those of the first electrode body 21 and the second electrode body 31. In the first ring-shaped member 22 and the second ring-shaped member 32, the whole of, or a part of, tip faces 22a and 32a may be made electrically conductive.

When the first ring-shaped member 22 and the second ring-shaped member 32 are made electrically conductive, the materials are not limited specifically. Their materials may be the same as, or may be different from, those of the first electrode body 21 and the second electrode body 31. However, it is preferable that the materials of the first ring-shaped member 22 and the second ring-shaped member 32 at least have a higher electric conductivity than that of the steel sheet set to be welded, in order that the first ring-shaped member 22 and the second ring-shaped member 32 can effectively draw the electric current flowing in the steel sheet during spot welding. The details of this will be described later.

The first combined electrode 20 and the second combined electrode 30 with the above-described configuration are mounted on a not-shown spot welding gun at the respective holders 24 and 34. More specifically, the welding gun has a pair of arms capable of opening and closing operations, and the holder 24 of the first combined electrode 20 is mounted on the end of one of the arms, and the holder 34 of the second combined electrode 30 is mounted on the end of the other arm. The opening and closing operations of both arms cause the first combined electrode 20 and the second combined electrode 30 to be closer or separated. Here, the first electrode body 21 and the second electrode body 31 are in a state of facing each other on the same axis. The first ring-shaped member 22 and the second ring-shaped member 32 are also in a state of facing each other on the same axis. One of the pair of the arms may be stationary.

In addition, the first electrode body 21 and the second electrode body 31 are connected to a not-shown power supply. For example, when a direct-current power supply is used as the power supply, the positive electrode of the power supply is connected to one of the first and the second electrode bodies 21 and 31, and the negative electrode to the other. An alternating current power supply can also be used as the power supply.

2. Resistance Spot Welding

As illustrated in FIG. 5A, a set of steel sheets are first provided as the material. The set of steel sheets have a lapped portion in which two steel sheets (11 and 12) are overlapped. Next, the first electrode body 21 of the first combined electrode 20 and the second electrode body 31 of the second combined electrode 30 are disposed facing each other with the lapped portion sandwiched therebetween, and, at the same time, the first ring-shaped member 22 and the second ring-shaped member 32 are disposed facing each other. This operation is performed by moving the welding gun or by conveying the steel sheet set.

Next, the closing operation of both arms of the welding gun starts the pressing operation of the first combined electrode 20 and the second combined electrode 30 against the lapped portion of the steel sheet set. Thereby, at the first combined electrode 20, the holder 24 moves toward the lapped portion, and simultaneously, at the second combined electrode 30, the holder 34 moves toward the lapped portion. Following this, at the first combined electrode 20, the tip face 22a of the first ring-shaped member 22 first comes into contact with and presses the surface of the second steel sheet 12, which prevents the further moving of the first ring-shaped member 22. At the second combined electrode 30, the tip face 32a of the second ring-shaped member 32 first comes into contact with and presses the surface of the first steel sheet 11, which prevents the further moving of the second ring-shaped member 32.

Subsequently, at the first combined electrode 20, the first electrode body 21 continues moving toward the second steel sheet 12. At this time, the distance between the first ring-shaped member 22 and the retainer plate 25 becomes gradually smaller, which causes the first elastic body 23 (compression coil spring 23A) to deform by compression. Simultaneously, at the second combined electrode 30, the second electrode body 31 continues moving toward the first steel sheet 11. At this time, the distance between the second ring-shaped member 32 and the retainer plate 35 becomes gradually small, which causes the second elastic body 33 (compression coil spring 33A) to deform by compression.

Subsequently, as illustrated in FIG. 5B, at the first combined electrode 20, the tip portion of the electrode tip 21*a* comes into contact with and presses the surface of the second steel sheet 12, which prevents the further moving of the first electrode body 21. Simultaneously, at the second combined electrode 30, the tip portion of the electrode tip 31*a* comes into contact with and presses the surface of the first steel sheet 11, which prevents the further moving of the second electrode body 31.

By pressing the tip portions of the electrode tips 31*a* and 21*a* against the respective surfaces of the first and the second steel sheets 11 and 12 (or by flowing an electric current between the first and the second electrode bodies 21 and 31 in this state), the indentations 15 (see FIGS. 4A to 4C) are formed.

In FIG. 4A, the bottom surfaces of the indentations 15, which are formed as depressed portions, correspond to the portions that have come into contact with the tip faces 21*aa* and 31*aa* of the first and the second electrode bodies 21 and 31 illustrated in FIGS. 5A and 5B. The inclined surfaces of the indentations 15 in FIG. 4A correspond to the inclined surfaces formed on the peripheries of the tip faces 21*aa* and 31*aa* and inclined with respect to the tip faces 21*aa* and 31*aa* in the electrode tips 21*a* and 31*a* illustrated in FIGS. 5A and 5B.

The portions corresponding to the inclined surfaces of the electrode tips 21*a* and 31*a* are not clearly exhibited in the indentations 15 illustrated in FIGS. 4B and 4C.

The diameters d of the indentations, which have been described with reference to FIGS. 4A to 4C, correspond to the diameters of the tip faces 21*aa* and 31*aa* of the electrode tips 21*a* and 31*a*.

As described above, the lapped portion of the steel sheet set is sandwiched by the first electrode body 21 and the second electrode body 31 that are facing each other. At the same time, the lapped portion is also sandwiched by the first ring-shaped member 22 and the second ring-shaped member 32 that are facing each other. At this time, the pressure from the first electrode body 21 and the second electrode body 31 is applied onto the lapped portion, and the pressure from the first ring-shaped member 22 and the second ring-shaped member 32 is also applied onto the lapped portion.

Here, the repulsive force of the first elastic body 23 that is in compressive deformation is acting on the first ring-shaped member 22, and the repulsive force of the second elastic body 33 that is also in compressive deformation is acting on the second ring-shaped member 32. Thereby, the first and the second steel sheets 11 and 12 are in close contact with each other over a wide area due to the fact that not only the region in contact with the first electrode body 21 and the second electrode body 31 is pressed, but also the peripheral region therearound (the region in contact with the first ring-shaped member 22 and the second ring-shaped member 32) is also pressed. Thereby, the generation of sheet separation (the first steel sheet 11 is separated from the second steel sheet 12 near the portion pressed by the electrode tips 21*a* and 22*a*) is restrained.

With this state being achieved, an electric current is applied between the first electrode body 11 and the second electrode body 21 by operating the power supply to weld the first steel sheet 11 and the second steel sheet 12.

Figure 6A:
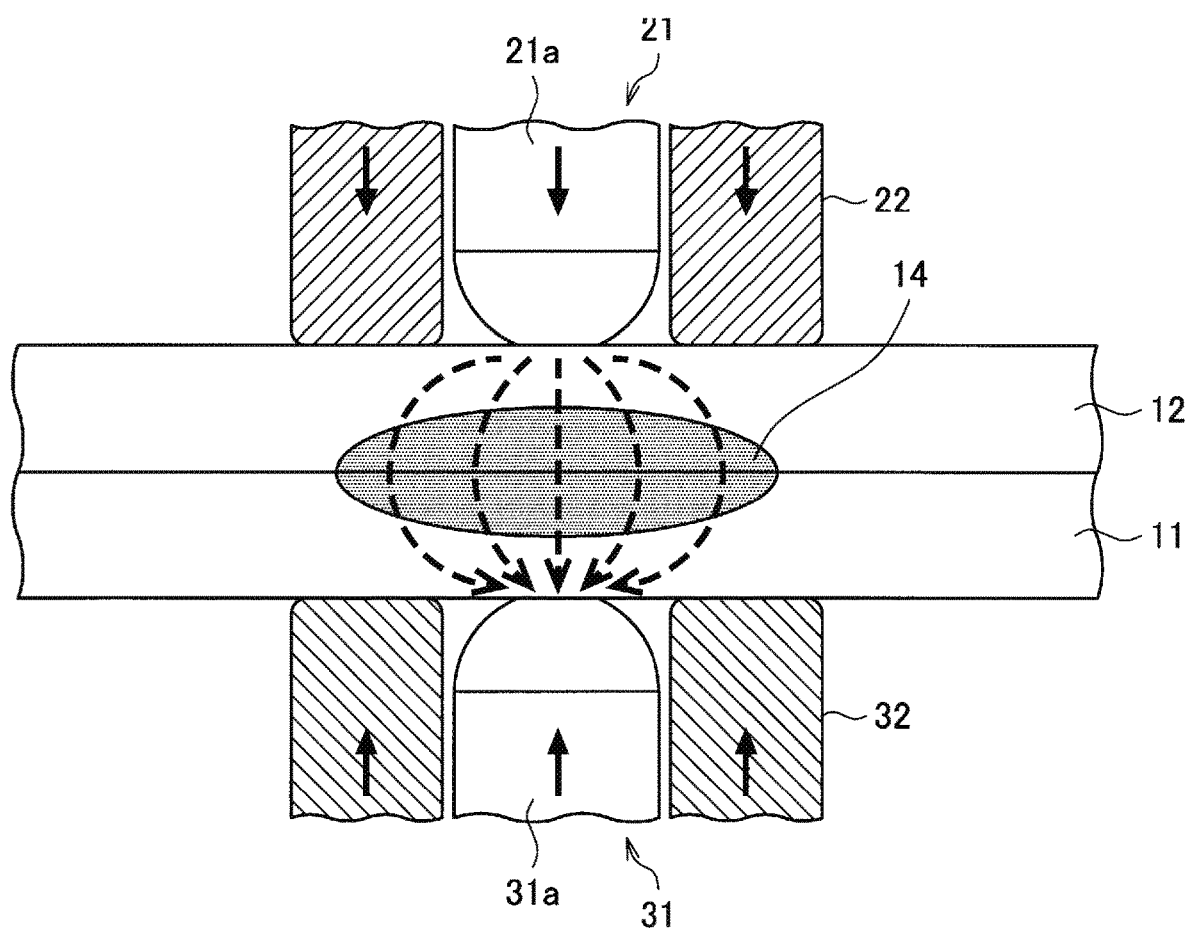
FIG. 6A is a schematic diagram illustrating a situation in which a weld nugget is formed by spot welding using the resistance spot welding apparatus illustrated in FIGS. 5A and 5B when a ring-shaped member is not electrically conductive.
Figure 6B:
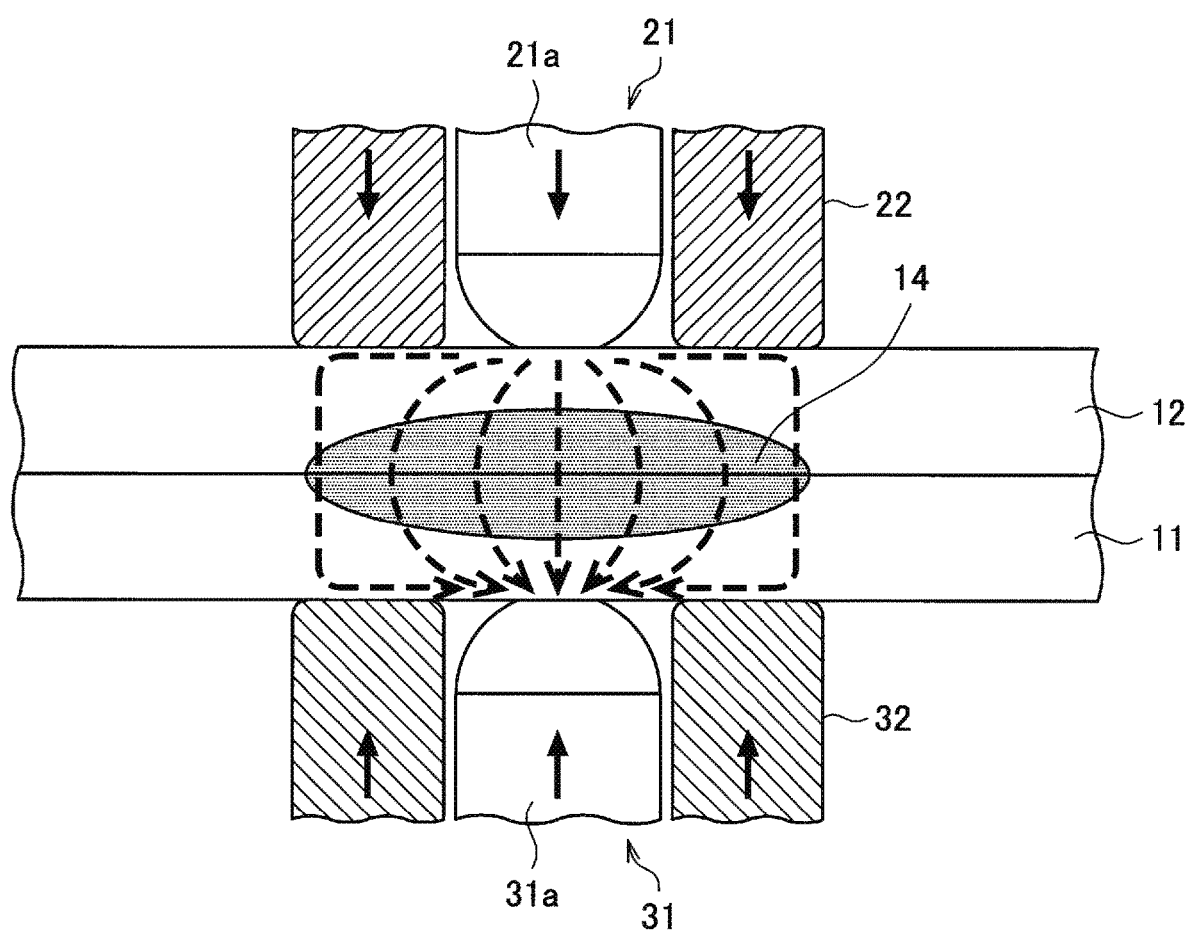
FIG. 6B is a schematic diagram illustrating a situation in which a weld nugget is formed by spot welding using the resistance spot welding apparatus illustrated in FIGS. 5A and 5B when a ring-shaped member is electrically conductive.

FIGS. 6A and 6B are schematic diagrams for describing the situation in which a weld nugget is formed by spot welding using the resistance spot welding apparatus illustrated in FIGS. 5A and 5B. FIG. 6A illustrates the case in which the first ring-shaped member 22 and the second ring-shaped member 32 are not electrically conductive, while FIG. 6B illustrates the case in which the first ring-shaped member 22 and the second ring-shaped member 32 are electrically conductive. In FIGS. 6A and 6B, dotted arrows represent the flow of welding current.

As illustrated in FIG. 6A, the contact region between the first and the second steel sheets 11 and 12 extends in a wide area, encompassing not only the contact region with the first electrode body 21 and the second electrode body 31, but also the surrounding contact region with the first ring-shaped member 22 and the second ring-shaped member 32. Thereby noticeable sheet separation does not occur. Thus, when an electric current is applied between the first electrode body 21 and the second electrode body 31, the electric current flows in a wider area as compared to known spot welding.

Especially when the first ring-shaped member 22 and the second ring-shaped member 32 are electrically conductive, the flow of the electric current spreads to an even wider area in the first and the second steel sheets 11 and 12 as illustrated in FIG. 6B. More specifically, the electric current not only spreads in a central area and flows from the first electrode body 21 to the second electrode body 31, but also is drawn from first electrode body 21 toward the first ring-shaped member 22, and then drawn toward the second ring-shaped member 32, and finally toward the second electrode body 31. This is because both of the first ring-shaped member 22 and the second ring-shaped member 32 have a high electric conductivity while the first and the second steel sheets 11 and 12 are in close contact with each other in the region where the first ring-shaped member 22 and the second ring-shaped member 32 are facing each other due to a strong pressure exerted by the first ring-shaped member 22 and the second ring-shaped member 32.

In general, expulsion (expulsion at the faying surface) is generated between metal sheets. However, a large amount of electric current applying to electrodes may cause the contact portion between the metal sheet and the electrode to be overheated to generate expulsion (expulsion at the outside surface) from the outer surface of the metal sheet. The embodiment illustrated in FIG. 6B, in which the first and the second ring-shaped members 22 and 32 are made electrically conductive, provides another advantage that the electric current makes a detour from the first and the second electrode bodies 21 and 31 to the first and the second ring-shaped members 22 and 32 which are electrically-conductive, which can suppress the heat generation at the contact portion between the electrodes and the metal sheet, and thereby can suppress the expulsion generation from the outer surface of the metal sheet.

Thus, the first and the second steel sheets 11 and 12 are pressed firmly by the first ring-shaped member 22 and the second ring-shaped member 32 so that the contact region between the first and the second steel sheets 11 and 12 melts over a wide area to form the nugget 14 having a large nugget diameter. In addition, according to this spot welding, the appropriate welding current range can be expanded with the nugget diameter being larger.

As described above, the method for manufacturing the welded structure according to the present embodiment provides effects of suppressing the sheet separation, suppressing the expulsion generation, expanding the nugget diameter, and expanding the appropriate welding current range.

These effects have been described by using the exemplary case with the steel sheet set including the first and the second steel sheets. These effects are not limited to the case of the steel sheet set including two steel sheets, but can be produced in the case including three steel sheets. Consequently, not only the welded structure according to the first embodiment but also the welded structure according to the second embodiment can be obtained by the method for manufacturing the welded structure of the present embodiment.

Note that, when the steel sheet set includes three steel sheets, the exerted pressure, the current value, and the welding current pattern will be properly adjusted as the need arises. Thereby, nuggets having a large diameter can be formed as is the case of the steel sheet set having two steel sheets, which will be described in Example later.

In order to suppress the sheet separation sufficiently, what is important are the distance between the peripheral edge of the tip face 21aa of the first electrode body 21 and the inner peripheral edge of the tip face 22a of the first ring-shaped member 22, and the distance between the peripheral edge of the tip face 31aa of the second electrode body 31 and the inner peripheral edge of the tip face 32a of the second ring-shaped member 32, when the electrode tips 21a and 31a are in contact with the steel sheet set. These distances are preferably as small as possible as far as no interference occurs during welding. If these distances are too large, the suppressing effect of the sheet separation becomes small, and also the electric current does not easily spread in the case that the first ring-shaped member 22 and the second ring-shaped member 32 are electrically conductive. These distances are preferably 7 mm or less, more preferably 5 mm or less, and still more preferably 3 mm or less.

One embodiment of the present invention has been described so far, but the present invention can also be implemented in other modes. For example, the welded structure may be a housing of an electric appliance (for example, a copying machine) that is manufactured by using a thin steel sheet. In this case, the welded structure according to the present invention, for example, may sufficiently absorb an impact shock so as to protect the inside of the appliance when the appliance falls.

EXAMPLES

The tests as described below were conducted to confirm the effects of the present invention.

One of the steel sheets A to C (Mat. A to Mat. C) in Table 2 was used in the tests. Table 2 shows the chemical composition and the properties of the steel sheet including thickness, yield strength (YS), tensile strength (TS), and breaking elongation (El) for each of the steel sheets A to C. All of the steel sheets A to C are those generally used for the framework members of automobiles. As shown in Table 2, the equivalent carbon content (Ceq) of each of the steel sheets A to C exceeds 0.15 mass %, which has been difficult to be welded without generating expulsion when known welding methods are used.

TABLE 2

| Steel sheet | Chemical composition (mass %) | | | | | Thickness t (mm) | Properties (TS is measured after quenching for hot-stamped steel sheets) | | | Remark |
| | C | Si | Mn | Cr | Ceq | | YS (MPa) | TS (MPa) | El % | |
| --- | --- | --- | --- | --- | --- | --- | --- | --- | --- | --- |
| A | 0.21 | 0.25 | 1.30 | 0.25 | 0.228 | 1.6 | 1162 | 1545 | 8.8 | Hot stamped |
| B | 0.31 | 0.25 | 1.69 | 0.20 | 0.332 | 1.6 | 1267 | 1882 | 7.8 | |
| C | 0.15 | 0.51 | 2.07 | 0.49 | 0.181 | 1.6 or 2.0 | 634.4 | 1011.4 | 17.2 | Cold rolled |

<Cross Tension Test>

By using the resistance spot welding apparatus illustrated in FIGS. 5A and 5B and a known resistance spot welding apparatus, two steel sheets were spot welded to manufacture corresponding welded structures, and then cross tension tests were conducted on these welded structures.

As described above, the resistance spot welding apparatus illustrated in FIGS. 5A and 5B, which had the first and the second combined electrodes 20 and 30 (hereinafter referred to as "movable electrodes"), was configured to sandwich the material with the first and the second electrode bodies 21 and 31 and with the first and the second ring-shaped members 22 and 32, to apply an electric current. The known spot welding apparatus was the one that corresponded to the resistance spot welding apparatus illustrated in FIGS. 5A and 5B, but excluded the first and the second ring-shaped members 12 and 22 and the first and the second elastic bodies 23 and 33, and the electrodes corresponding to the first and the second electrode bodies 21 and 31 (hereinafter referred to as "normal electrodes") were configured to sandwich the material to apply an electric current.

In either case, the steel sheets C (2.0 mm in thickness) in Table 2 were used as the two steel sheets. The average thickness per steel sheet $t_{ave}$ was 2.0 mm at the lapped portion, and thus the thickness fell in a range from 1.1025 to 2.6 mm. Spot welding was carried out with the electric current value being varied. The cross tension tests were conducted in accordance with the method stipulated in Japanese Industrial Standards (JIS) Z 3137.

Figure 12:
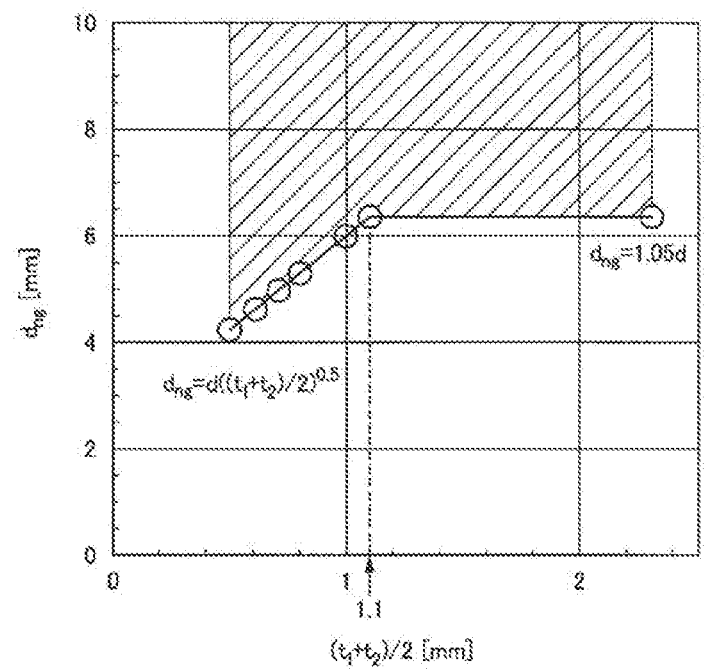
FIG. 12 is a characteristic diagram showing a relation between nugget diameters $d_{ng}$ (mm) and an average thickness per material steel sheet $t_{ave}$ (mm) when a welded structure is obtained by the method according to present embodiment.

FIG. 12 is a characteristic diagram showing a relation between obtained nugget diameters $d_{ng}$ (mm) and average thicknesses $t_{ave}$ (mm) per material steel sheet when the welded structures are obtained by the method according to present embodiment. In the welded structure in which two steel sheets are joined by spot welding at a plurality of locations, the average thickness on the transverse axis of FIG. 12 is $t_{ave}=(t_1+t_2)/2$, where the thicknesses of the steel sheets at the lapped portion in which two steel sheets are overlapped are represented by $t_1$ and $t_2$.

According to the manufacturing method of the present embodiment, the relation between the nugget diameter $d_{ng}$ (mm) and the average thickness $t_{ave}$ (mm) were obtained in the range indicated by hatching in FIG. 12. More specifically, it was found that different characteristics in the relation among the nugget diameter $d_{ng}$ (mm), the average thickness $t_{ave}$ (mm), and the tip diameter d (mm) of the electrode used for spot welding could be obtained on the two sides of the boundary of the average thickness $t_{ave}=1.1$ (mm).

More specifically, when 0.5 mm≤$t_{ave}$<1.1 mm, the condition (a) below was obtained.

$$(a) d_{ng} > d(t_{ave})^{1/2} \quad (1)$$

In addition, when 1.1 mm≤$t_{ave}$<2.6 mm, the condition (b) below was obtained.

$$(b) d_{ng} > 1.05d \quad (2)$$

A thin joint in which the average thickness $t_{ave}$ per material steel sheet is less than 1.1 mm is susceptible to the generation of peel stress at a weld portion because the flexural rigidity is low. To suppress the interfacial peeling caused by the peel stress at the weld portion, the nugget diameter $d_{ng}$ (mm) needs to be controlled to satisfy the condition (a). In contrast, when the average thickness $t_{ave}$ per material steel sheet is 1.1 mm or more, the flexural rigidity is high, and thus the interfacial peeling at a weld portion can be suppressed by providing a nugget diameter $d_{ng}$ (mm) of more than 1.05d as indicated in the condition (b). Therefore, by satisfying the condition (a) or (b), the manufactured welded structure can provide desired deformation behavior.

Figure 7:
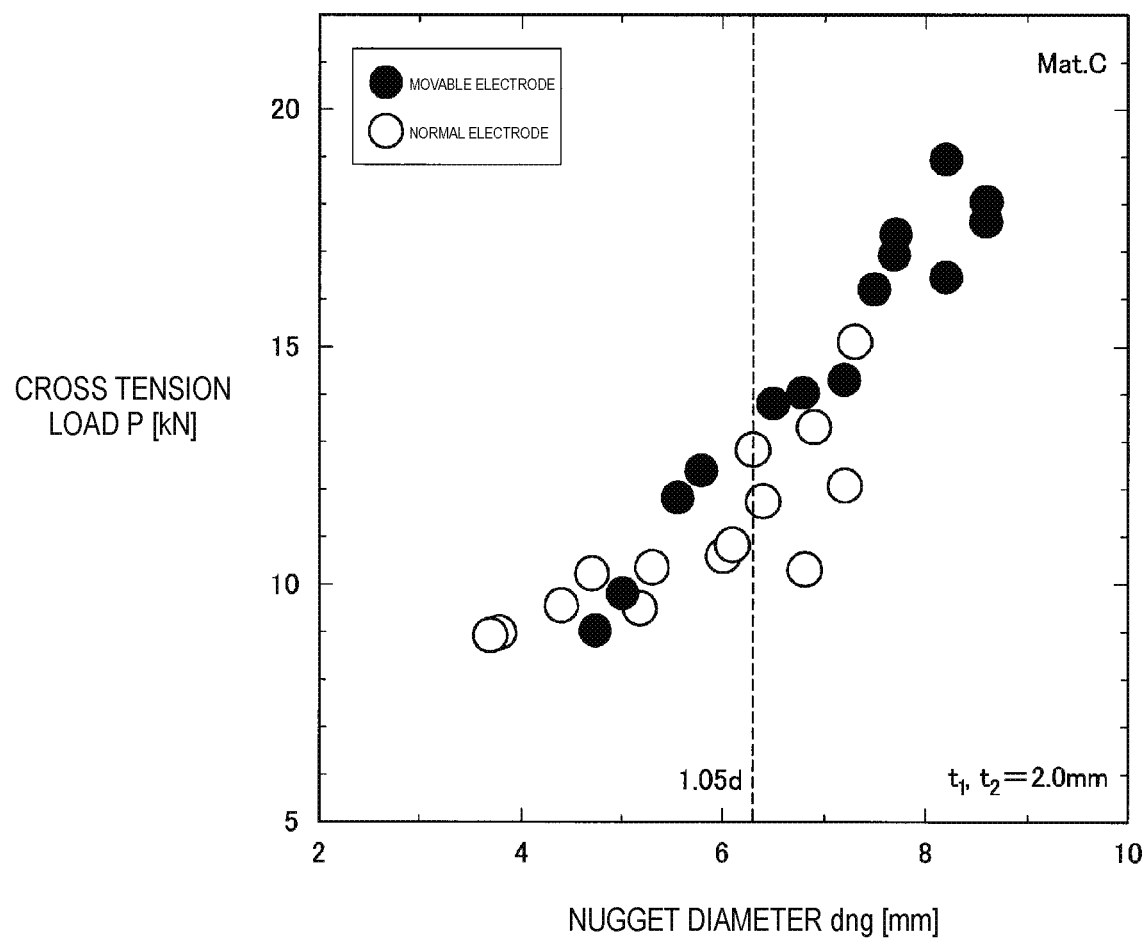
FIG. 7 is a diagram showing a relation between nugget diameters and cross tension loads.

The welded structures manufactured using the movable electrodes did not have spatters adhering thereto, but the welded structures manufactured using the normal electrodes had spatters adhering thereto. FIG. 7 shows a relation between the nugget diameter $d_{ng}$ and the cross tension load P. In FIG. 7, the dotted line indicates that the nugget diameter equals to 1.05d (d is the tip diameter of the electrodes used in spot welding). In FIG. 7, the welded structures according to the present invention are those using the movable electrodes that satisfy $d_{ng}$>1.05d.

Either case of using the movable electrodes or using the normal electrodes exhibits a tendency in which the cross tension load P becomes larger as the nugget diameter $d_{ng}$ becomes larger. However, the case of using the normal electrodes exhibits a large dispersion in the cross tension load P with the same nugget diameter $d_{ng}$, as compared to the case of using the movable electrodes, and has not necessarily provided a level of the cross tension load P equivalent to the case of using the movable electrodes even when $d_{ng}$>1.05d is satisfied (for welded structures having no spatter adhesion). Welded structures without spatter adhesion have stably exhibited high cross tension loads P as compared to those with spatter adhesion. In the case of using the movable electrodes, both the spot weld portions that satisfy $d_{ng}$>1.05d and the spot weld portions that satisfy $d_{ng}$≤1.05d have been obtained. However, the welded structure that satisfies $d_{ng}$>1.05d can be stably obtained by properly setting welding conditions.

When the nugget diameter $d_{ng}$ cannot be made larger than a certain size, there arises a limitation in suppressing fracture at the weld portion. Especially as the tensile strength of the steel sheet becomes larger, the stress expected at the weld portion becomes larger. Thus, it is necessary to form strong welds by obtaining a large nugget diameter $d_{ng}$. Moreover, as the steel sheet becomes thicker, the stress expected at the weld portion becomes larger. Thus, it is also necessary to form strong welds by obtaining a large nugget diameter $d_{ng}$.

In contrast, as the tensile strength of the steel sheet becomes larger, the electric resistance becomes larger accordingly, causing expulsion to occur due to heat generation during welding. The generation of expulsion causes the nugget diameter to be smaller and the steel sheet thickness to be smaller, and also makes it difficult to carry out stable welding. As a result, the welded steel sheets are vulnerable to peeling. Thus, it is desirable to obtain a larger nugget diameter $d_{ng}$ while suppressing the expulsion generation.

According to the present embodiment, the steel sheets to be welded are in contact with each other firmly and securely by pressing, against the steel sheet, the first ring-shaped member 22 included in the first combined electrode 20 and the second ring-shaped member 32 included in the second combined electrode 30. Thereby, the nugget diameter $d_{ng}$ can be reliably made larger, which causes the strength of the weld portion to be substantially higher. In addition, when the first ring-shaped member 22 and the second ring-shaped member are made electrically conductive, the electric current flows in a wide area as illustrated in FIG. 6B. This lowers the electric current density, which enables the generation of expulsion to be securely prevented. Consequently, even if the steel sheets having a tensile strength of 980 MPa or more are used, the nugget diameter $d_{ng}$ that satisfies the condition (a) or (b) can be obtained, and the generation of expulsion can be suppressed, according to the present embodiment. Thereby, the joining strength of the weld portion can be made considerably larger and the peeling at the weld portion can be reliably prevented. In other words, when known manufacturing methods are used, it is difficult to obtain the nugget diameter $d_{ng}$ that satisfies the condition (a) or (b) especially for the steel sheet having a tensile strength of 980 MPa or more.

Moreover, if the movable electrodes according to the present embodiment are not used, there are not many solutions to enlarge the nugget diameter except for increasing the pressure exerted by the electrodes so as to flow a large amount of the electric current. On the other hand, when the movable electrodes according to the present embodiment are used, the first ring-shaped member 22 and the second ring-shaped member 32 are pressed against the steel sheet in the peripheries of the first electrode body 21 and the second electrode body 31, which enables the nugget diameter to be larger while suppressing sheet separation. Thus, while known electrodes exerts a large pressure to cause the gap between the steel sheets to be wider, the movable electrodes according to the present embodiment enables the sheet gap to be sufficiently small by suppressing the sheet separation. Consequently, in the deformation process in a collision event, the joint formed of the weld portion with the larger sheet gap by the known method tends to enter a stress state of peeling the weld portion, thus causing the weld portion to be peeled off. On the other hand, the joints having large diameter nuggets formed by the movable electrodes according to the present embodiment have a sheet gap smaller than that formed by the known electrodes, thereby securely suppressing the peeling off during deformation in a collision event.

<Crushing Test>

Crushing tests (what is called "dynamic deformation impact tests") were conducted on the welded structures with the procedure as described below. The crushing tests were conducted in two different conditions, in other words, bending deformation conditions and axial crush deformation conditions, which are basic testing modes related to actual automobile collisions.

1. Bending Deformation

Figure 8:
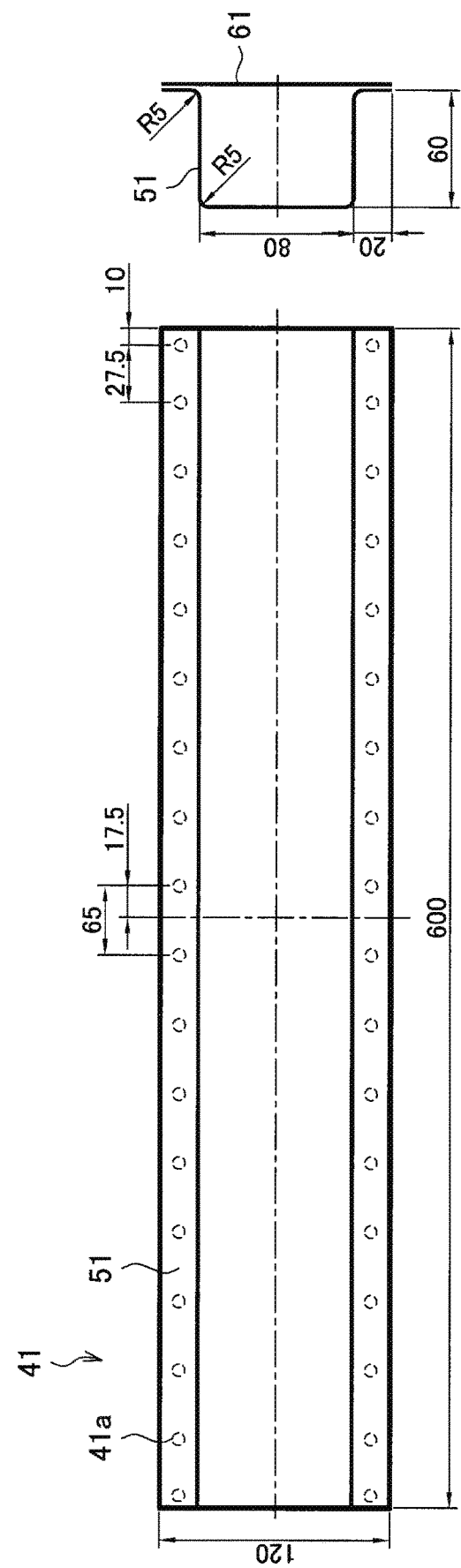
FIG. 8 is an illustration including a front view and a right side view showing shapes and dimensions of a hat-channel member and a closing plate included in a welded structure that is used in crushing tests by bending deformation.

Hat-channel members and closing plate members formed of the steel sheets A and B were prepared. FIG. 8 illustrates the shapes and dimensions of the hat-channel member and the closing plate member. As illustrated in FIG. 8, the hat-channel member, which was 120 mm in width, 60 mm in height, and 600 mm in length, had 20 mm wide protruding portions (bent portions and flanges) at both sides in the widthwise direction. The flanges were overlapped and were spot welded with the closing plate member having the same length and width with the hat-channel member.

Spot welding was conducted by using the movable electrodes, and also using the normal electrodes. The interval between weld portions were set at 17.5 mm and 35 mm.

This welded structure was placed on two semicylindrical jigs (the curvature radius of the cylindrical portion: 30 mm) with the closing plate member facing upward. At this time, two jigs were positioned in parallel with each other with a 440 mm spacing therebetween and with each cylindrical portion facing upward.

Using a hydraulic compression tester, the semicylindrical impactor (the curvature radius of the cylindrical portion: 150 mm) was collided from above against the mid portion in the longitudinal direction of the welded structure in this state, at a velocity of 8.6 km/h with the cylindrical portion facing downward.

On this occasion, the displacement of the impactor was measured, and also the deformation resistance following the bending deformation was measured by using piezoelectric load cells built in the impactor. The test displacement, which is an amount of the impactor movement, was set at 60 mm. Based on the curve of the deformation resistance against the test displacement, the deformation resistance was integrated with respect to the test displacement (from the point the impactor collided with the welded structure to the point the impactor moved 45 mm) to obtain an absorbed energy U when the welded structure was subjected to bending deformation.

Figure 9:
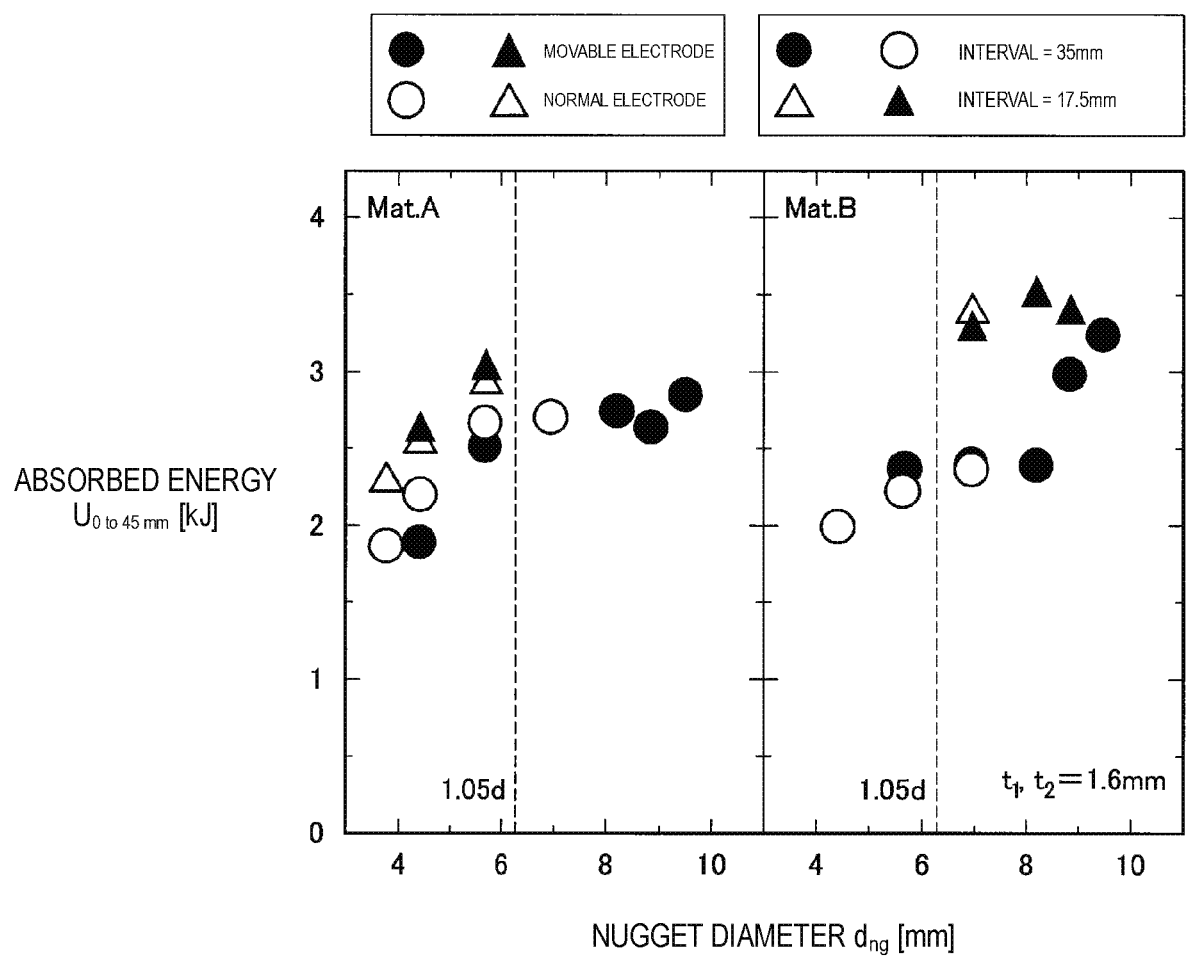
FIG. 9 is a diagram showing relations between nugget diameters and absorbed energy in bending deformation.

FIG. 9 shows a relation between the nugget diameter $d_{ng}$ and the absorbed energy U. As shown in FIG. 9, in either case of using the steel sheet A (Mat. A) or of using the steel sheet B (Mat. B), the absorbed energy U generally becomes larger as the nugget diameter $d_{ng}$ becomes larger. When the steel sheet A is used and the nugget diameter $d_{ng}$ exceeds 1.05d, the absorbed energy U stably exhibits high values.

When the steel sheet A is used, the difference in the interval between the weld portions does not cause the absorbed energy U to become largely different. In the case of using the steel sheet B, when the welded structures using the movable electrodes are compared with each other, the welded structures having an interval of 17.5 mm tend to exhibit higher absorbed energies as compared to the welded structures having an interval of 35 mm. As shown in Table 2, the steel sheet B has an equivalent carbon content higher than that of the steel sheet A. When a steel sheet with a high equivalent carbon content (for example, a steel sheet with Ceq>0.3) is used, it is preferable to make the interval smaller to obtain a sufficiently high absorbed energy.

2. Axial Crush Deformation

Figure 10:
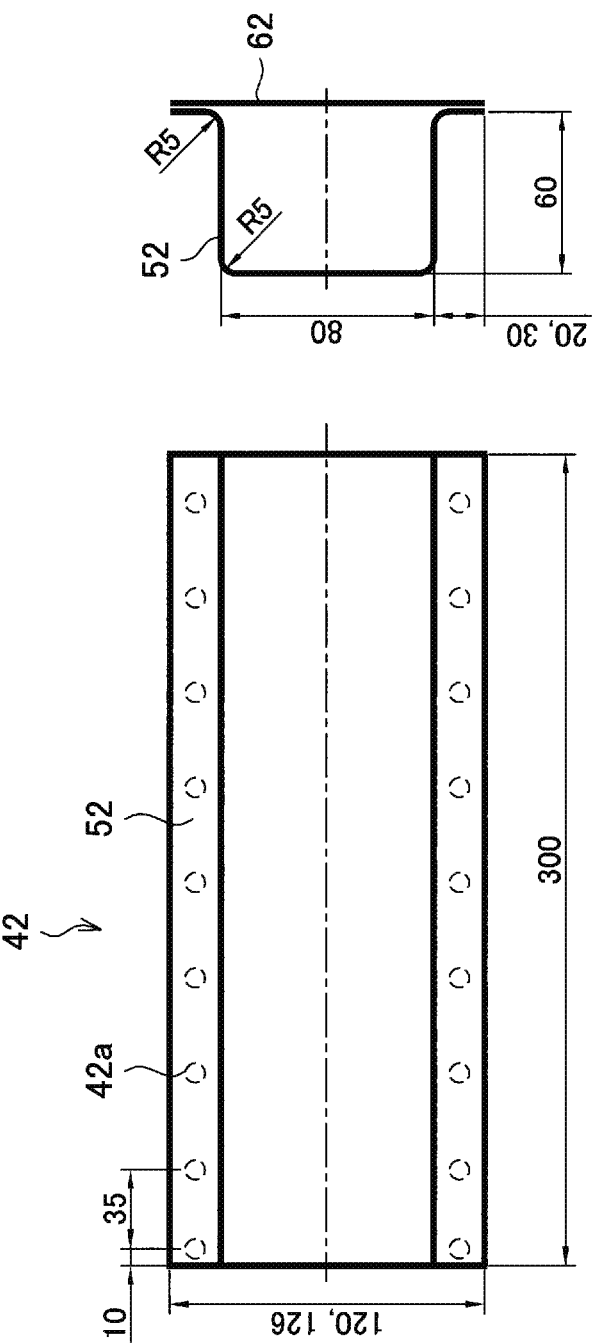
FIG. 10 is an illustration including a front view and a right side view showing shapes and dimensions of a hat-channel member and a closing plate included in a welded structure that is used in axial crushing tests.

Hat-channel members and closing plate members formed of the steel sheets C (having a thickness of 1.6 mm) were prepared. FIG. 10 illustrates the shapes and dimensions of the hat-channel member and the closing plate member. As illustrated in FIG. 10, the hat-channel member, which was 120 mm or 126 in width, 60 mm in height, and 300 mm in length, had 20 mm or 23 mm wide protruding portions (bent portions and flanges) at both sides in the widthwise direction. The length of each bent portion in the widthwise direction of the hat-channel member is 5 mm, and thus the width of the flange is 15 mm or 18 mm. The flanges were overlapped and were spot welded with the closing plate member having the same length and width with the hat-channel member.

Spot welding was conducted by using the movable electrodes, and also using the normal electrodes. The interval between weld portions were set at 35 mm.

The axial direction of the welded structure was aligned to a vertical direction, and then the falling weight having a mass of 850 kg was fallen freely from a height of 4.83 m and was collided from above against the welded structure in the axial direction thereof at a velocity of 35 km/h. On this occasion, the displacement of the falling weight was measured, and the deformation resistance of the welded structure was also measured by using piezoelectric load cells. Based on the curve of the deformation resistance against the displacement of the falling weight, the deformation resistance was integrated with respect to the displacement of the falling weight (from the point the falling weight collided with the welded structure to the point the falling weight moved 200 mm) to obtain an absorbed energy U when the welded structure was subjected to axial crush deformation.

Figure 11:
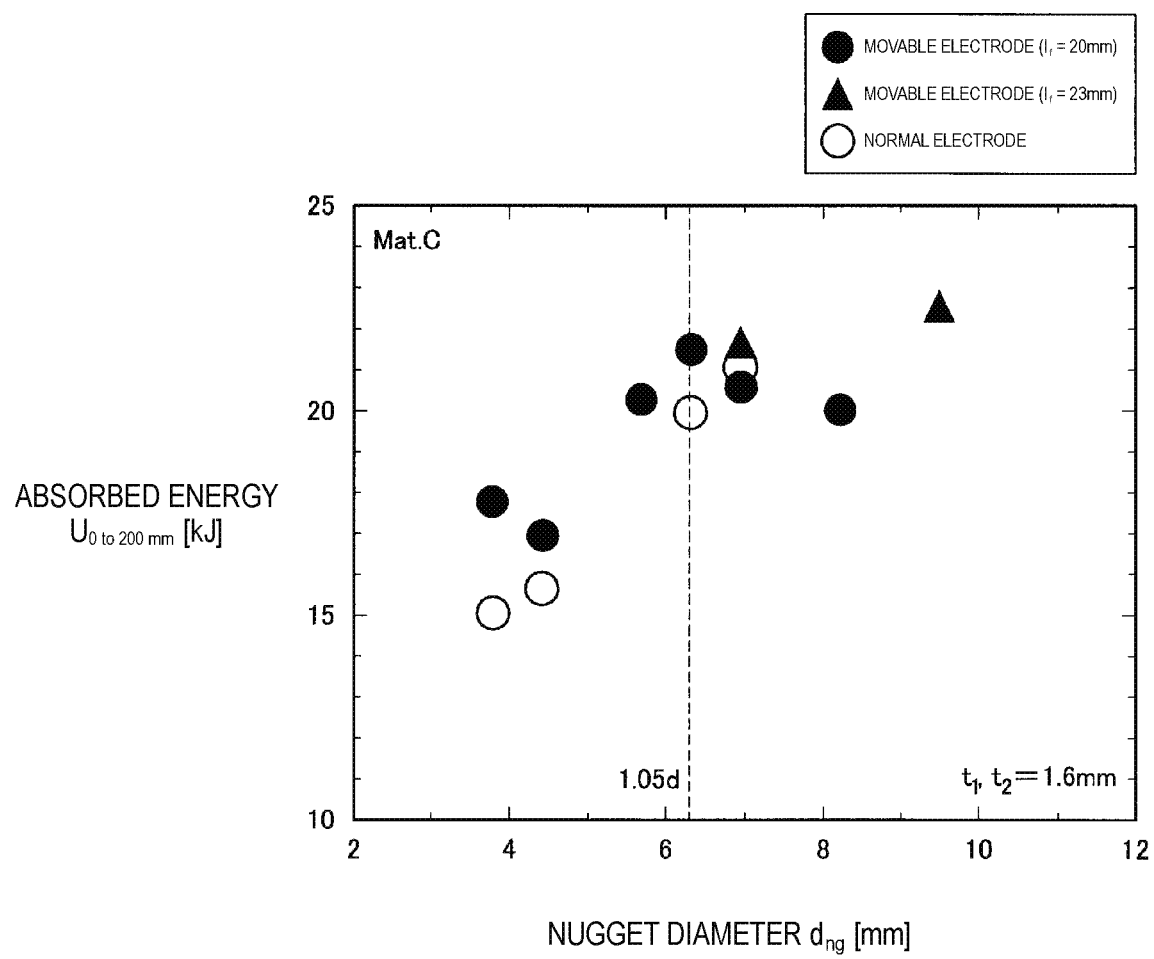
FIG. 11 is a diagram showing a relation between nugget diameters and absorbed energy in axial crush deformation.

FIG. 11 shows a relation between the nugget diameter $d_{ng}$ and the absorbed energy U. In the legend in FIG. 11, "$l_f$=20 mm" represents the case where a flange width is 20 mm, and "$l_f$=23 mm" represents the case where a flange width is 23 mm. As illustrated in FIG. 11, the absorbed energy U generally becomes larger as the nugget diameter $d_{ng}$ becomes larger, and the absorbed energy U stably exhibits high values when the nugget diameter $d_{ng}$ exceeds 1.05d.

Incidentally, while the welding using the movable electrodes described above is used as a main joining method, laser welding or adhesion may be used together as an auxiliary joining method. In this case, an adhesive such as an electrically conductive weldbond, etc., can be used.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 10, 41 to 46 welded structure
11, 51 to 56 first steel sheet
12, 61 to 66 second steel sheet
73 to 76 third steel sheet
13, 41a, 42a spot weld portion
14 nugget
15 indentation

The invention claimed is:

1. A resistance spot welding apparatus comprising:
a first rod-shaped electrode body,
a second rod-shaped electrode body,
a first ring-shaped member,
a second ring-shaped member,
a first compression coil spring,
a second compression coil spring,
a first holder, and
a second holder, wherein
the first rod-shaped electrode body and the second rod-shaped electrode body are arranged facing each other,
the first ring-shaped member and the second ring-shaped member are arranged facing each other,
the first holder is fixed to the first rod-shaped electrode body on a side opposite to the second rod-shaped electrode body and the first holder is mounted on a spot welding gun,
the second holder is fixed to the second rod-shaped electrode body on a side opposite to the first rod-shaped electrode body and the second holder is mounted on a spot welding gun,
the first rod-shaped electrode body is inserted into a through hole of the first ring-shaped member, the first compression coil spring is connected between the first ring-shaped member on a side opposite to the second rod-shaped electrode body and the first holder, the first rod-shaped electrode body and the first ring-shaped member are not electrically connected each other, the second rod-shaped electrode body is inserted into a through hole of the second ring-shaped member, the second compression coil spring is connected between the second ring-shaped member on a side opposite to the first rod-shaped electrode body and the second holder, and the second rod-shaped electrode body and the second ring-shaped member are not electrically connected each other.

2. A method for manufacturing a welded structure using the resistance spot welding apparatus according to claim 1, comprising:

overlapping two or three steel sheets, sandwiching the steel sheets between the first rod-shaped electrode body and the second rod-shaped electrode body, pressing the first rod-shaped electrode body, the second rod-shaped electrode body, the first ring-shaped member, and the second ring-shaped member against the steel sheets, and applying an electric current between the first rod-shaped electrode body and the second rod-shaped electrode body, wherein the pressure of the first rod-shaped electrode body and the second rod-shaped electrode body are applied onto the steel sheets by the spot welding gun directly, the pressure of the first ring-shaped member is applied onto the steel sheets by the first compression coil spring, and the pressure of the second ring-shaped member is applied onto the steel sheets by the second compression coil spring.

3. The method for manufacturing a welded structure according to claim 2, wherein the welded structure comprises a nugget and when a diameter of the nugget is $d_{ng}$(mm), a tip diameter of first rod-shaped electrode body is $d$ (mm), and an average thickness per steel sheet of the steel sheets is $t_{ave}$(mm), the spot weld portion satisfies a condition (a) or a condition (b) below in accordance with the average thickness $t_{ave}$(mm)

$$(a) d_{ng} > d(t_{ave})^{1/2} \text{ when } 0.5 \text{ mm} \leq t_{ave} < 1.1 \text{ mm} \tag{1}$$

$$(b) d_{ng} > 1.05 d \text{ when } 1.1 \text{ mm} \leq t_{ave} \leq 2.6 \text{ mm} \tag{2}.$$

* * * * *